US009047262B2

(12) United States Patent
Fujii

(10) Patent No.: US 9,047,262 B2
(45) Date of Patent: Jun. 2, 2015

(54) SEMICONDUCTOR DATA PROCESSING DEVICE, TIME-TRIGGERED COMMUNICATION SYSTEM, AND COMMUNICATION SYSTEM

(71) Applicant: Renesas Electronics Corporation, Kawasaki-shi, Kanagawa (JP)

(72) Inventor: Makoto Fujii, Tokyo (JP)

(73) Assignee: RENESAS ELECTRONICS CORPORATION, Kawasaki-shi, Kanagawa (JP)

( * ) Notice: Subject to any disclaimer, the term of this patent is extended or adjusted under 35 U.S.C. 154(b) by 309 days.

(21) Appl. No.: 13/666,836

(22) Filed: Nov. 1, 2012

(65) Prior Publication Data

US 2013/0159577 A1   Jun. 20, 2013

(30) Foreign Application Priority Data

Nov. 2, 2011 (JP) ................................ 2011-241114

(51) Int. Cl.
*G06F 13/24* (2006.01)
(52) U.S. Cl.
CPC ...................................... *G06F 13/24* (2013.01)
(58) Field of Classification Search
USPC ................................................. 710/260–269
See application file for complete search history.

(56) References Cited

U.S. PATENT DOCUMENTS

| 5,708,814 | A | * | 1/1998 | Short et al. | 710/260 |
|---|---|---|---|---|---|
| 5,708,817 | A | * | 1/1998 | Ng et al. | 710/266 |
| 5,826,091 | A | * | 10/1998 | Shah et al. | 710/260 |
| 6,219,727 | B1 | * | 4/2001 | Kailash et al. | 710/48 |
| 6,543,000 | B1 | * | 4/2003 | Wright | 713/500 |
| 7,415,561 | B2 | * | 8/2008 | Jinzaki | 710/267 |
| 7,818,751 | B2 | * | 10/2010 | Togawa | 718/108 |
| 8,001,309 | B2 | * | 8/2011 | Patzelt et al. | 710/261 |
| 8,504,753 | B2 | * | 8/2013 | Danko | 710/262 |
| 2008/0235424 | A1 | * | 9/2008 | Lee et al. | 710/260 |
| 2011/0055446 | A1 | | 3/2011 | Fujii | |
| 2011/0213906 | A1 | * | 9/2011 | Gustafsson et al. | 710/262 |
| 2012/0144081 | A1 | * | 6/2012 | Smith et al. | 710/269 |

FOREIGN PATENT DOCUMENTS

JP          2011-76584 A      4/2011

OTHER PUBLICATIONS

"Flex Ray Communication System Protocol Specification" Ver. 2. 1 Rev. A (Dec. 15, 2005).

* cited by examiner

*Primary Examiner* — Raymond Phan
(74) *Attorney, Agent, or Firm* — Miles & Stockbridge P.C.

(57) ABSTRACT

The variation of the timing of starting interrupt processing in response to a timer interrupt request is reduced regardless of the condition of processing of other interrupts. A semiconductor data processing device incorporated in each of plural electronic control devices coupled to a network for time-triggered communication system is provided with a central processing unit, a communication control circuit and an interrupt control circuit. The communication control circuit has a local time timer for use in time-triggered communication and issues, based on time counting by the local time timer, a timer interrupt request for time-triggered communication. When a timer interrupt request for time-triggered communication is received, the interrupt control circuit performs control to cause the central processing unit to delay, by a predetermined reservation time, starting the interrupt processing to be performed in response to the timer interrupt request.

17 Claims, 25 Drawing Sheets

FIG. 19 (RECEPTION)

SEMICONDUCTOR DATA PROCESSING DEVICE, TIME-TRIGGERED COMMUNICATION SYSTEM, AND COMMUNICATION SYSTEM

CROSS-REFERENCE TO RELATED APPLICATIONS

The disclosure of Japanese Patent Application No. 2011-241114 filed on Nov. 2, 2011 including the specification, drawings and abstract is incorporated herein by reference in its entirety.

BACKGROUND

The present invention relates to interrupt control techniques making use of a local time timer included in a semiconductor data processing device applied to a terminal coupled to a network for time-triggered communication in which communication is performed in synchronization with a common time used in the network and also relates to techniques related with time-triggered communication systems effectively applicable to, for example, communication systems included in electronic control devices for automobiles.

In communication systems in which frames are exchanged between plural terminals via a transmission path, particularly, communication systems for communications between electronic control devices applied to, for example, vehicle-mounted devices or factory production lines, time trigger systems to control, based on time, the timing of, for example, frame transmission/reception or setting changes are used. For example, techniques based on FlexRay (registered trademark) are applied to vehicle-mounted networks used as time trigger systems. In such systems, to integrate a terminal into a network, time synchronization based on a common time used in the network (referred to as a "global time") is established as described in "Flex Ray Communication System Protocol Specification Ver. 2.1 Rev. A (15 Dec. 2005)." The time synchronization is established using the time when a frame called a start-up frame transmitted from at least one terminal already integrated in the network is received by the terminal to be integrated into the network and the expected arrival time of the start-up frame calculated based on a communication schedule by the terminal to be integrated into the network.

With such time synchronization established, transmission/reception processing based on a predetermined time schedule is enabled between terminals. To be concrete, a time-triggered communication protocol requires the terminals coupled to a network to perform communication while maintaining network time synchronization between them. For this, each terminal uses a local time timer which operates based on its own network time. When a local time set on a local time timer is reached, the local time timer issues an interrupt request to a CPU. Responding to the interrupt request, the CPU writes a transmit message to a RAM or reads a receive message from a reception buffer. In this way, transmission/reception processing based on a time schedule is enabled. Namely, the timing of transmission/reception processing is defined by a local time set on the local time timer. Thus, terminals to operate in time-triggered communication are required to synchronize, in real time, their local times with a global time. Therefore, it is not appropriate to use a general-purpose timer included in a microcomputer as a local time timer.

Applying the timer interrupt control technique disclosed in Japanese Unexamined Patent Publication No. 2011-76584 to the above interrupt control performed using a local time timer allows an interrupt control circuit to give an interrupt signal accompanied by a corresponding cause of interrupt to a CPU. This reduces the processing to be performed by the CPU to acquire interrupt cause data.

SUMMARY

The present inventors have further studied interrupt control performed using the above local time timer for time-triggered communication and have obtained the following findings. According to the findings, in time-triggered communication typically as in cases where software based on the AUTOSAR (Automotive Open System Architecture) standard aimed at vehicle-mounted software standardization is used, the interrupts in the CPU that may occur include those not caused by timer interrupts generated by a local time timer based on a time schedule for time-triggered communication. It is, therefore, expected that, when a timer interrupt request is generated by a local time timer while an interrupt request which is not a timer interrupt request generated by a local time timer is being processed, starting of transmission/reception processing to be performed in response to the timer interrupt request is delayed because of inhibition of multiple interrupt processing or because of the interrupt priority levels involved with the length of the delay varying depending on the case. This is considered to make it difficult to perform high-accuracy real-time control using a vehicle-mounted electronic control device. Thus, just reducing the load on the CPU using the technique disclosed in Japanese Unexamined Patent Publication No. 2011-76584 cannot be a fundamental solution. There is also a secondary problem. Namely, in time-triggered communication, the amount of reduction of the load on the CPU that can be realized using the technique disclosed in Japanese Unexamined Patent Publication No. 2011-76584 is not adequate. For example, the processing to be performed by the CPU to set a local time according to a time schedule every time a timer interrupt request is generated by a local time timer increases the data processing load on the CPU.

An object of the present invention is to provide a semiconductor data processing device which can reduce, regardless of the state of other interrupt processing, variation in the timing of starting interrupt processing in response to a timer interrupt request.

Another object of the present invention is to provide a time-triggered communication system which can perform time-triggered communication without widely deviating from a time schedule for transmission/reception operation.

The above and other objects and novel features of the present invention will become apparent from the following description when taken in conjunction with the accompanying drawings.

A problem solving means according to the invention disclosed in the present application is as follows.

In a semiconductor data processing device to perform prescribed processing responding to a notification from a timer, when there is processing to be performed at a predetermined time, accepting an interrupt for other processing is inhibited during a predetermined period of time before the processing is started.

An advantageous effect of the invention disclosed in the present application is as follows.

Namely, with accepting an interrupt for other processing inhibited during a predetermined period of time before processing to be performed at a predetermined time is started, performing the processing at the predetermined time is ensured.

DETAILED DESCRIPTION

1. Outline of an Embodiment

Figure 1:
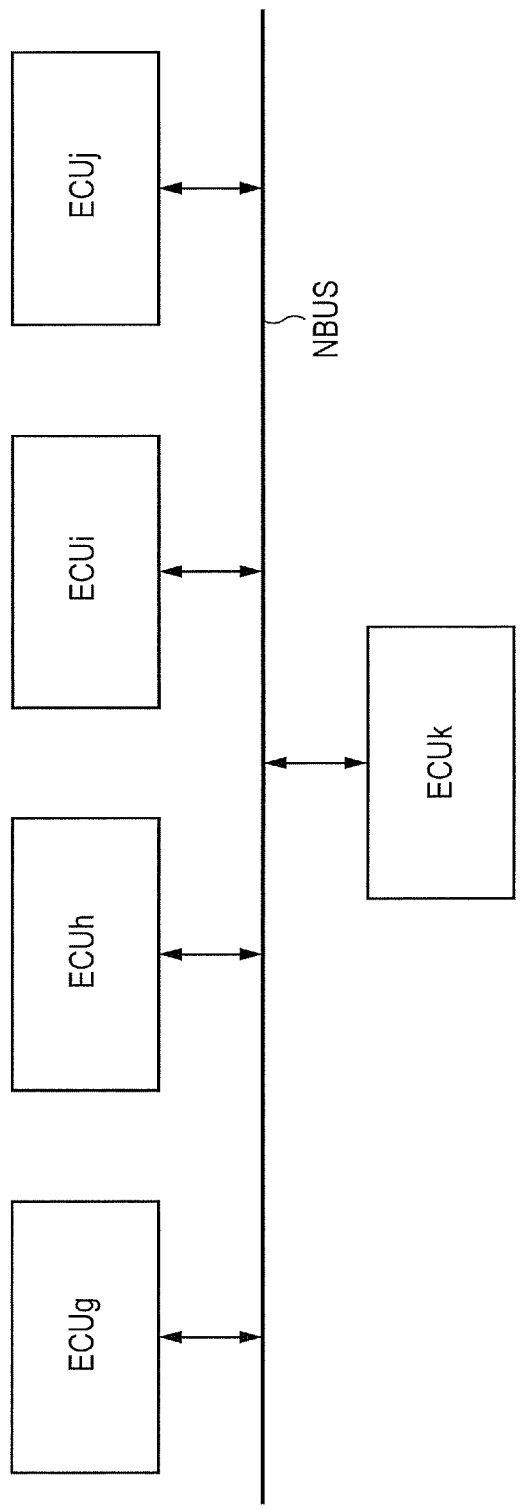
FIG. 1 is a block diagram showing an example time-triggered communication system according to an embodiment of the present invention.

First, the configuration of a semiconductor data processing device according to a typical embodiment of the invention disclosed in the present application will be described.

A semiconductor data processing device incorporated in each of plural electronic control devices coupled to a network for time-triggered communication system is provided with a central processing unit, a communication control circuit and an interrupt control circuit. The communication control circuit has a local time timer for use in time-triggered communication and issues, based on time counting by the local time timer, a timer interrupt request for time-triggered communication. When a timer interrupt request for time-triggered communication is received, the interrupt control circuit performs control to cause the central processing unit to delay, by a predetermined reservation time, starting the interrupt processing to be performed in response to the timer interrupt request and inhibits other interrupt requests from being processed by the central processing unit. Namely, the reservation time is used, when there is processing to be performed at a predetermined time, to ensure that the central processing unit will not be engaged, at the predetermined time, in any processing resulting from other interrupt requests.

When control based on the reservation time is not performed, depending on the condition of data processing by the central processing unit at a time of occurrence of a timer interrupt request for time-triggered communication, the time taken before the central processing unit can start processing the timer interrupt request varies. Such time variation in starting processing of the timer interrupt request can be absorbed or reduced when the reservation time is set. Using the reservation time, therefore, makes it easy to cause the central processing unit to start processing the timer interrupt request for time-triggered communication at the predetermined timing regardless of the condition of data processing by the central processing unit at the time when the timer interrupt request is received.

With the semiconductor data processing device configured as described above, variation of the timing of starting interrupt processing in response to a timer interrupt request can be reduced regardless of the condition of processing of other interrupts. This makes it easy to control, without widely deviating from a predetermined time schedule, time-triggered communication in which terminals coupled to a network perform transmission/reception operation in synchronization with a common time used in the network.

Next, a typical embodiment of the invention disclosed in the present application will be outlined. Note that the reference numerals used in attached drawings and referred to in parentheses in the following outline description of a typical embodiment of the present invention merely denote example constituent elements included in the concepts of possible constituent elements.

(1) Delaying Starting of Interrupt Processing to be Performed in Response to Interrupt Request for Time-Triggered Communication A semiconductor data processing device (1) according to a typical embodiment of the present invention includes a central processing unit (10) for executing commands, a communication control circuit (12) for performing communication control for time-triggered communication and an interrupt control circuit (11) for performing interrupt control to cause the central processing unit to perform processing responding to an interrupt request. The communication control circuit has a local time timer (35) used for time-triggered communication and generates a timer interrupt request (20) for time-triggered communication based on time counting by the local time timer. The interrupt control circuit performs control such that, when a timer interrupt request for time-triggered communication is received, the central processing unit to respond to the timer interrupt request delays, by a predetermined reservation time, starting interrupt processing.

When the delay control based on the reservation time is not performed, depending on the condition of data processing by the central processing unit at a time of occurrence of a timer interrupt request for time-triggered communication, the time taken before the central processing unit can start processing the timer interrupt request varies. When the delay control based on a reservation time is performed as described above, starting of processing, by the central processing unit, of a timer interrupt request for time-triggered communication is delayed by the reservation time, so that the variation of the time when the central processing unit can start interrupt processing in response to the timer interrupt request for time-triggered communication can be absorbed or reduced. It will be satisfactory if the reservation time is set to be long enough to completely absorb the above time variation. Also, setting the local time timer to a time preceding, by a reservation time, the target time for starting interrupt processing will prevent the timing of transmission/reception processing from being generally delayed. Thus, regardless of the condition of data processing being performed by the central processing unit, it can be made easy to cause the central processing unit to start interrupt processing in response to a timer interrupt request for time-triggered communication at a predetermined timing. Thus, it is possible to control, not to allow a predetermined time schedule to be widely deviated from, time-triggered communication in which terminals coupled to a network perform transmission/reception processing in synchronization with a common time used in the network.

(2) Reservation Time Set to be Longer than Maximum Time Required for Interrupt Processing In the above aspect (1), the reservation time is longer than a maximum time taken by the central processing unit to perform interrupt processing.

In this way, the above described time variation can be completely absorbed by the reservation time.

(3) Higher Priority-Level Interrupt Request Generated During Predetermined Time Period In the above aspect (2), when a timer interrupt request for time-triggered communication is followed, within the reservation time, by another interrupt request, the interrupt control circuit causes the central processing unit to start interrupt processing after elapse of the reservation time giving priority to whichever of the another interrupt request and the timer interrupt request is higher in interrupt priority level.

This allows a higher-priority interrupt request such as for error processing to be processed before any timer interrupt request for time-triggered communication. In this way, recovery processing following a system fault can be smoothly carried out without being affected by a timer interrupt request for time-triggered communication, so that system security is ensured.

(4) Inhibition of Multiple Interrupt Processing

In the above aspect (3), the interrupt control circuit has an operation mode for inhibiting multiple interrupt processing in which the central processing unit engaged in interrupt processing responding to a first interrupt request starts interrupt processing responding to a second interrupt request received after the first interrupt request. For example, such a multiple interrupt inhibition mode may be set as an initial setting state to follow powering on of the semiconductor data processing device or may be set to be effective during a certain period of time preceding the foregoing reservation time.

Inhibiting multiple interrupt processing can reduce possible irregularity in transmission/reception processing in time-triggered communication. For example, when the multiple interrupt inhibition mode is set as an initial setting, the reservation time can be set to a maximum time possibly taken by the semiconductor data processing device in processing an interrupt. This makes setting the reservation time easy. When the multiple interrupt inhibition mode is set to be effective during a certain period of time preceding the reservation time, it is necessary to study possible interrupt combinations which can generate a state of multiple interrupt processing and to set the reservation time to a time required to process the combination of interrupts that would take the most time to be processed. In this latter case, setting the reservation time is a little more difficult than in the first case. In either case, however, interrupt processing taking place when a timer interrupt request for time-triggered communication is made is completed during the reservation time, so that possible irregularity in transmission/reception processing in time-triggered communication can be reduced.

(5) Timing Data for Setting Local Time Timer Subtracted by Interrupt Reservation Time in Advance In one of the above aspects (1) to (4), timing data set on the local time timer for specifying timing of generating a timer interrupt request for time-triggered communication specifies a time which precedes, by the reservation time, true timing of generating the timer interrupt request.

In this way, a time preceding, by the reservation time, the time when processing of a target timer interrupt is to be started is set on the local time timer, so that the timing of transmission/reception processing in time-triggered communication can easily be prevented from being generally delayed.

(6) CPU Referring to Transmission/Reception Start Timing Table

In one of the above aspects 1 to 5, the semiconductor data processing device has a memory (13) for storing a timing table (50) which holds timing data to be set on the local time timer to specify timing of generating a timer interrupt request for time-triggered communication. In the semiconductor data processing device, the central processing unit, in interrupt processing performed responding to an interrupt signal corresponding to a timer interrupt request for time-triggered communication, reads next timing data to be set on the local time timer from the memory and sets the next timing data on the local time timer. Also, in the semiconductor data processing device, the communication control circuit generates a timer interrupt request after elapse of the time specified by the timing data set on the local time timer.

In this way, every time a timer interrupt request for time-triggered communication is received, the central processing unit is required to access the timing table and set next timing data on the local time timer, but the contents of processing to be performed can be flexibly specified by an interrupt processing program.

(7) Communication Control Circuit Referring to Transmission/Reception Start Timing Table In one of the above aspects 1 to 5, the semiconductor data processing device has a memory (60) for storing a timing table (50) which holds timing data to be set on the local time timer to specify timing of generating a timer interrupt request for time-triggered communication. In the semiconductor data processing device, the communication control circuit refers to timing data held in the timing table every time the count of the local time timer is updated and, when the timing data referred to coincides with the updated count, generates a timer interrupt request.

In this way, the central processing unit is not required to set next timing data on the local time timer by performing interrupt processing and accessing the timing table every time a timer interrupt request for time-triggered communication is received. This can reduce the load on the central processing unit due to interrupt processing and can contribute toward reducing the time taken for interrupt processing by the CPU and improving the efficiency of communication processing in time-triggered communication.

(8) Local Time Timer Channel Provided for Each Cause of Timer Interrupt

In one of the above aspects 1 to 5, the communication control circuit has, as the local time timer, plural timer channels on which timing data specifying timings of generating different timer interrupt requests for plural types of interrupt processing are individually set.

In this way, the central processing unit is not required to set next timing data on the local time timer by performing interrupt processing and accessing the timing table every time a timer interrupt request for time-triggered communication is received. This can reduce the load on the central processing unit due to interrupt processing and can contribute toward reducing the time taken for interrupt processing by the CPU and improving the efficiency of communication processing in time-triggered communication.

(9) Cause of Interrupt Pushed to CPU Along with Interrupt Signal

In one of the above aspects 1 to 5, the communication control circuit outputs, as a timer interrupt request, a timer interrupt request signal and a cause signal indicating a cause of the interrupt and, responding to the timer interrupt request signal and the cause signal, the interrupt control circuit outputs an interrupt signal and interrupt cause data required for branching to interrupt processing to the central processing unit.

In this way, when notified of an interrupt corresponding to a timer interrupt request for time-triggered communication, the central processing unit is not required to access the cause register of the communication control device or interrupt control circuit to acquire the cause of the interrupt. This can reduce the load on the central processing unit due to interrupt processing and can contribute toward reducing the time taken for interrupt processing by the CPU and improving the efficiency of communication processing in time-triggered communication.

(10) Transmit Data Transferred from RAM to Communication Control Circuit by DMAC In one of the above aspects 1 to 5, the semiconductor data processing device has a RAM (14) to be accessed by the central processing unit and a direct memory access controller (18) in which the central processing unit sets transfer control information for controlling a data transfer from the RAM to the communication control circuit. The central processing unit causes, in interrupt processing for transmission performed in response to a timer interrupt request for time-triggered communication, the direct memory access controller to start data transfer operation and transfer transmit data from the RAM to the communication control circuit.

In this way, when performing interrupt processing for transmission in response to a timer interrupt request, the central processing unit is not required to perform data access operation for transferring the transmit data from the RAM to the communication control circuit. Necessary data transfer is efficiently performed by the direct memory access controller. Therefore, the load due to interrupt processing on the central processing unit can be reduced. This contributes toward reducing the time taken for interrupt processing by the central processing unit and improving the efficiency of transmission processing in time-triggered communication.

(11) Communication Control Circuit Having Bus Access Function for Reading Transmit Data from RAM In one of the above aspects 1 to 5, the semiconductor data processing device has a RAM to be accessed by the central processing unit. After elapse of a time specified by timing data set on the local time timer, the communication control circuit performs bus access operation to transfer transmit data from the RAM to a transmission buffer and, responding to completion of the bus access operation, generates a timer interrupt request for time-triggered communication. For this, the reservation time may be set by taking into account the time required for the bus access operation.

In this way, when the local time timer reaches a timeout, the communication control circuit accesses, before requesting a timer interrupt request, the RAM using its bus access function and acquires transmit data. Therefore, when performing interrupt processing for transmission in response to a subsequent timer interrupt request, the central processing unit is not required to perform data access operation for transferring the transmit data from the RAM to the communication control circuit. Thus, the load due to interrupt processing on the central processing unit can be reduced. This contributes toward reducing the time taken for interrupt processing by the central processing unit and improving the efficiency of transmission processing in time-triggered communication.

(12) Receive Data Transferred Froth Communication Control Circuit to RAM by DMAC In one of the above aspects 1 to 5, the semiconductor data processing device has a RAM (14) to be accessed by the central processing unit and a direct memory access controller (18) in which the central processing unit sets transfer control information for controlling a data transfer from the communication control circuit to the RAM. In interrupt processing for reception performed in response to a timer interrupt request for time-triggered communication, the central processing unit causes the direct memory access controller to start data transfer operation and transfer receive data from the communication control circuit to the RAM.

In this way, when performing interrupt processing for reception in response to a timer interrupt request, the central processing unit is not required to perform data access operation for transferring receive data from the communication control circuit to the RAM. Necessary data transfer is efficiently performed by the direct memory access controller. Therefore, the load due to interrupt processing on the central processing unit can be reduced. This contributes toward reducing the time taken for interrupt processing by the central processing unit and improving the efficiency of reception processing in time-triggered communication.

(13) Communication Control Circuit Having Bus Access Function for Writing Receive Data to RAM In one of the above aspects 1 to 5, the semiconductor data processing device has a RAM to be accessed by the central processing unit. After elapse of a time specified by timing data set on the local time timer, the communication control circuit performs bus access operation to transfer receive data from a reception buffer to the RAM and, responding to completion of the bus access operation, generates a timer interrupt request for time-triggered communication.

In this way, when the local time timer reaches a timeout, the communication control circuit, transfers, before requesting a timer interrupt request, receive data from a reception buffer to the RAM. Therefore, when performing interrupt processing for reception in response to a subsequent timer interrupt request, the central processing unit is not required to perform data access operation for transferring the receive data from the reception buffer to the RAM. Thus, the load due to interrupt processing on the central processing unit can be reduced. This contributes toward reducing the time taken for interrupt processing by the central processing unit and improving the efficiency of reception processing in time-triggered communication.

(14) Delaying Starting of Interrupt Processing; Local Time Timer Channel Provided for Each Cause of Interrupt; Interrupt Signal and Cause of Interrupt Pushed to CPU In another aspect of the present invention, a semiconductor data processing device has a central processing unit for executing commands, a communication control circuit for performing communication control for time-triggered communication and an interrupt control circuit for performing interrupt control to cause the central processing unit to perform processing responding to an interrupt request. The communication control circuit has a local time timer used for time-triggered communication and generates a timer interrupt request for time-triggered communication based on time counting by the local time timer. The interrupt control circuit performs control such that, when a timer interrupt request for time-triggered communication is received, the central processing unit to respond to the timer interrupt request delays, by a predetermined reservation time, starting interrupt processing. The communication control circuit has, as the local time timer, plural timer channels on which timing data specifying timings of generating different timer interrupt requests for plural types of interrupt processing are individually set and outputs, as a timer interrupt request, a timer interrupt request signal and a cause signal indicating a cause of the interrupt. The interrupt control circuit outputs, responding to the timer interrupt request signal and they cause signal, an interrupt signal and interrupt cause data required for branching to interrupt processing to the central processing unit.

In this way, the operations and effects similar to those of the above aspects 1, 8 and 9 can be realized.

(15) Communication Control Circuit Having Bus Access Function for Reading Transmit Data from RAM In the above aspect 14, the semiconductor data processing device has a RAM to be accessed by the central processing unit. The communication control circuit performs, after elapse of a time specified by timing data set on the local time timer, bus access operation to transfer transmit data from the RAM to a transmission buffer and, responding to completion of the bus access operation, generates a timer interrupt request for time-triggered communication.

In this way, the operation and effect similar to those of the above aspect 11 can be realized.

(16) Communication Control Circuit Having Bus Access Function for Writing Receive Data to RAM In the above aspect 14, the semiconductor data processing device has a RAM to be accessed by the central processing unit. After elapse of a time specified by timing data set on the local time timer, the communication control circuit performs bus access operation to transfer receive data from a reception buffer to the RAM and, responding to completion of the bus access operation, generates a timer interrupt request for time-triggered communication.

In this way, the operation and effect similar to those of the above aspect 13 can be realized.

(17) Reservation Time Set to be Longer than Maximum Time Required for Interrupt Processing In the above aspect (14), the reservation time is longer than a maximum time taken by the central processing unit to perform interrupt processing.

In this way, the operation and effect similar to those of the above aspect 2 can be realized.

(18) Higher Priority-Level Interrupt Request Generated During Predetermined Time Period In the above aspect (17), when a timer interrupt request for time-triggered communication is followed, within the reservation time, by another interrupt request, the interrupt control circuit causes the central processing unit to start interrupt processing after elapse of the reservation giving priority to whichever of the another interrupt request and the timer interrupt request is higher in interrupt priority level.

In this way, the operation and effect similar to those of the above aspect 3 can be realized.

(19) Time-Triggered Communication System

A time-triggered communication system according to still another aspect of the present invention includes plural electronic control units which, by being coupled to a bus, configure a network and which perform transmission/reception operation in synchronization with a common time used in the network. Each of the electronic control units has a transmission unit to perform frame transmission, a reception unit to perform frame reception, a local time timer to perform timer operation based on a local time specific to each electronic control unit and a time synchronization control unit which adjusts the local time timer based on a difference between a time when a frame is expected to be received and a time when the frame is received. Each of the electronic control units also has a storage unit which stores a communication schedule specifying a frame transmission/reception procedure to be performed in a periodic communication cycle and setting information related with the communication schedule, and a control unit which, by causing the local time timer and the time synchronization control unit to operate based on the communication schedule and the setting information, controls communication operation of the electronic control unit performed using the transmission unit and the reception unit. The control unit has a central processing unit which controls communication operation by executing a command and an interrupt control circuit which performs interrupt control to cause the central processing unit to perform processing responding to an interrupt request. The local time timer generates a timer interrupt request for time-triggered communication based on time counting performed based on the setting information related with the communication schedule. The interrupt control circuit performs control such that, when a timer interrupt request for time-triggered communication is received, the central processing unit to respond to the timer interrupt request delays, by a predetermined reservation time, starting interrupt processing.

In this way, the operation and effect similar to those of the above aspect 1 can be realized and it becomes possible to control, not to allow a predetermined time schedule to be widely deviated from, time-triggered communication in which terminals coupled to a network perform transmission/reception processing in synchronization with a common time used in the network.

(20) A communication system according to still another aspect of the present invention includes plural electronic control units which are coupled to a network and which perform communication via the network at a predetermined time. At least one of the electronic control units includes a semiconductor device having a central processing unit, an interrupt control circuit, a communication control circuit and a timer circuit. The timer circuit detects arrival of the predetermined time to perform communication and gives a notification to the interrupt control circuit. Responding to the notification received from the timer circuit, the interrupt control circuit gives an interrupt notification to the central processing unit. At the predetermined time, the communication control circuit performs communication via the network. When the interrupt control circuit receives, after receiving a notification from the timer circuit and before the predetermined time is reached, another notification, the central processing unit is inhibited from performing processing responding to a different interrupt notification resulting from the another notification received by the interrupt control circuit.

In this way, time-synchronous communication performed over a network by terminals coupled to the network can be controlled not to widely deviate from a time schedule.

(21) In the above aspect 20, when, after receiving a notification from the timer circuit and before the predetermined time is reached, a different interrupt notification is received from another circuit, the interrupt control circuit inhibits the different interrupt notification from being transmitted to the central processing unit.

In this way, interrupt processing corresponding to the different interrupt notification can be easily inhibited.

(22) In the above aspect 20, the interrupt control circuit has a time counting circuit and, when the predetermined time has been counted by the time counting circuit after a notification is received from the timer circuit, gives an interrupt notification to the central processing unit.

In this way, interrupt notification to the central processing unit can be easily controlled using the timer circuit.

(23) In the above aspect 22, the interrupt control circuit has a register in which an amount of time to be counted after a notification is received from the timer circuit until the predetermined time is reached can be set.

In this way, a time period during which processing corresponding to an additional interrupt notification is inhibited can be variably controlled based on a value set in the register.

(24) In the above aspect 23, the timing of notification from the timer circuit is set by the communication control circuit.

In this way, the timing of notification can be determined according to communication control.

(25) In the above aspect 21, the communication system and the electronic control units are automobile-mounted.

This contributes toward improving the reliability of electronic control performed using a vehicle-mounted network.

2. Details of Embodiment

An embodiment of the present invention will be described in further detail.

<Time-Triggered Communication System>

FIG. 1 shows an example time-triggered communication system according to an embodiment of the present invention. The time-triggered communication system shown in FIG. 1 conforms to, for example, the FlexRay standard and is configured with plural electronic control units, for example, controllers for vehicle-mounted devices which are coupled to a network bus. Such electronic control units configuring the time-triggered communication system are controlled to perform transmission/reception processing in synchronization with a global time used in the network. Electronic control units ECUg to ECUk representatively shown in FIG. 1 are coupled to a network bus NBUS thereby configuring the network.

In the time-triggered communication system shown in FIG. 1, frames (packets or messages) are transmitted/received based on time slots generated by dividing each communication cycle of a predetermined length. The right to transmit in each time slot is defined based on a communication schedule determined at the time of system design.

Figure 2:
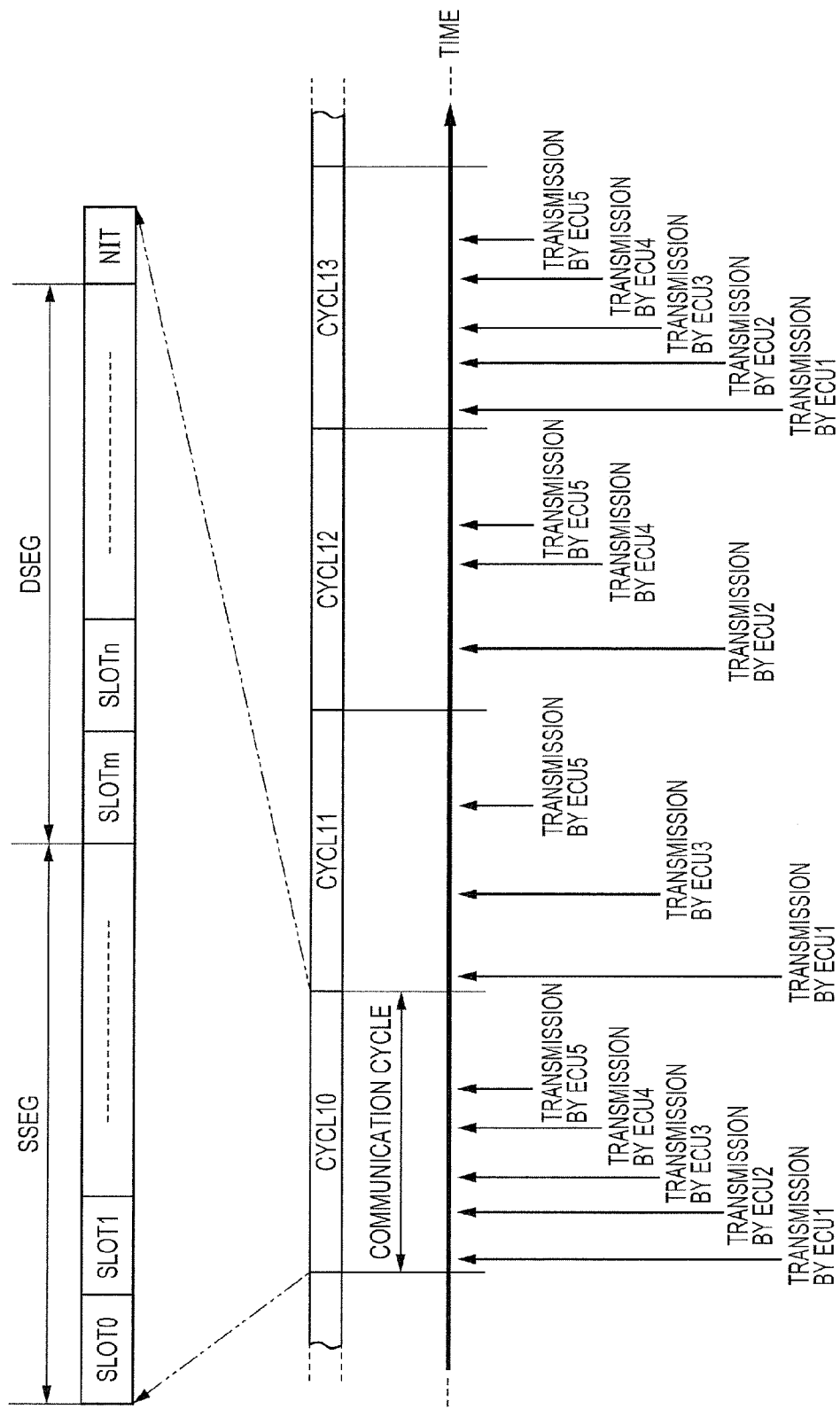
FIG. 2 is an explanatory diagram showing an example mode of communication operation performed based on a communication schedule and using communication cycles and time slots in a time-triggered communication system.

FIG. 2 shows an example mode of communication operation performed based on a communication schedule and using communication cycles and time slots in a time-triggered communication system. In FIG. 2, example communication cycles CYCL10 to CYCL13 are shown. In each of cycles CYCL10 to CYCL13, predetermined electronic control units among ECU1 to ECU5 are to transmit data using predetermined slots, respectively. Each cycle of the FlexRay communication pattern shown in FIG. 2 is comprised of a static segment SSEG, a dynamic segment DSEG and a network idle time NIT.

Figure 3:
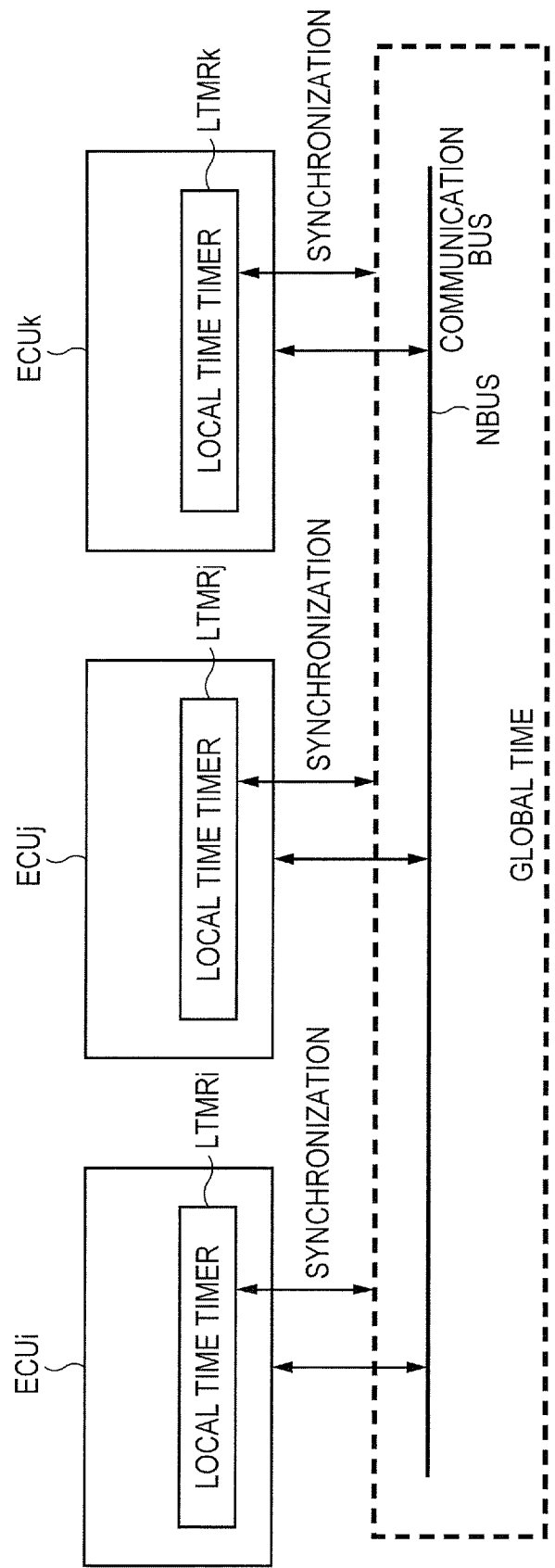
FIG. 3 is an explanatory diagram showing the principle of synchronization between electronic control units in time-triggered communication.
Figure 4:
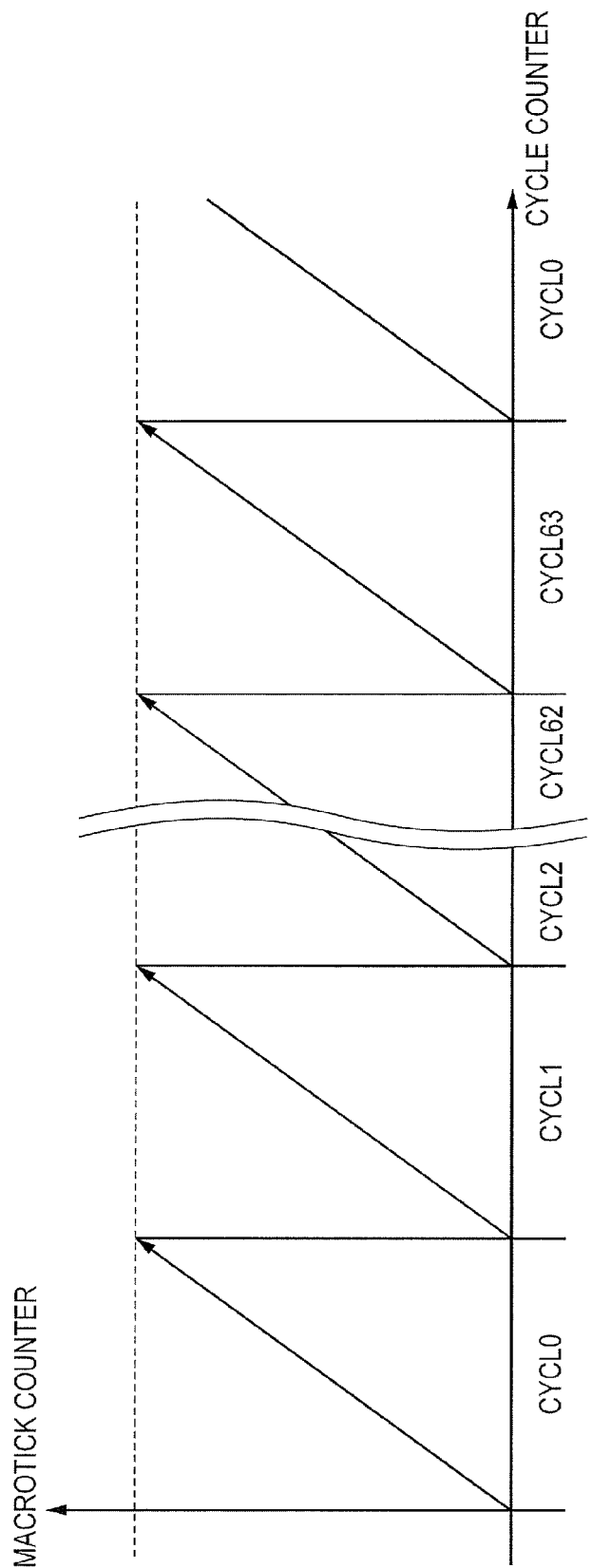
FIG. 4 is a diagram for explaining the manner in which a local time timer measures local time using a macrotick counter and a cycle counter.

FIG. 3 shows the principle of synchronization between electronic control units in time-triggered communication. Referring to FIG. 3, for time-triggered communication, the electronic control units ECUi, ECUj and ECUk, representatively shown as terminals coupled to the network bus NBUS, are required to engage in communication while synchronizing their respective local times with a global time used in the network. Hence, the electronic control units ECUi, ECUj and ECUk have local time timers LTMRi, LTMRj and LTMRk, respectively, which operate based on their local times. The local time timers LTMRi, LTMRj and LTMRk conforming to the FlexRay standard each include two counters based on two different units, a macrotick counter and a cycle counter. As shown in FIG. 4, the macrotick counter defines each cycle time to be, for example, 2048 counts and the cycle counter cyclically numbers cycles defining each cycle to be 64 counts. The cycle counter count is incremented by one at every 2048 macrotick counts.

As described in the foregoing, each terminal coupled to a network for time-triggered communication carries out, when performing frame transmission/reception based on communication cycles or time slots, synchronization (time synchronization) to synchronize its own local time with a global time commonly used in the network. This is to avoid frame collisions when frames are transmitted/received based on communication cycles and time slots. In time synchronization carried out at each electronic control unit, the relative error between the expected arrival time of a synchronization frame transmitted from a predetermined electronic control unit and the actual arrival time of the synchronization frame is sampled based on the count of the macrotick counter included in the local time timer, then, based on the sampled error, an offset value for adjustment is given to the macrotick counter (may be referred to as "offset correction") and the counting frequency of the macrotick counter is corrected (may be referred to as "frequency correction" or "rate correction")

As described above, the timing of frame transmission/reception performed between electronic control units using a time-triggered communication protocol is determined by setting time data on the local time timer of each electronic control unit based on the communication schedule of the electronic control unit. The setting thus made is subjected, as required, to offset correction and rate correction to achieve time synchronization. When a timer interrupt is generated according to the time data set on the local time timer, data transmission/reception processing is synchronously performed according to a predetermined time schedule.

Figure 5:
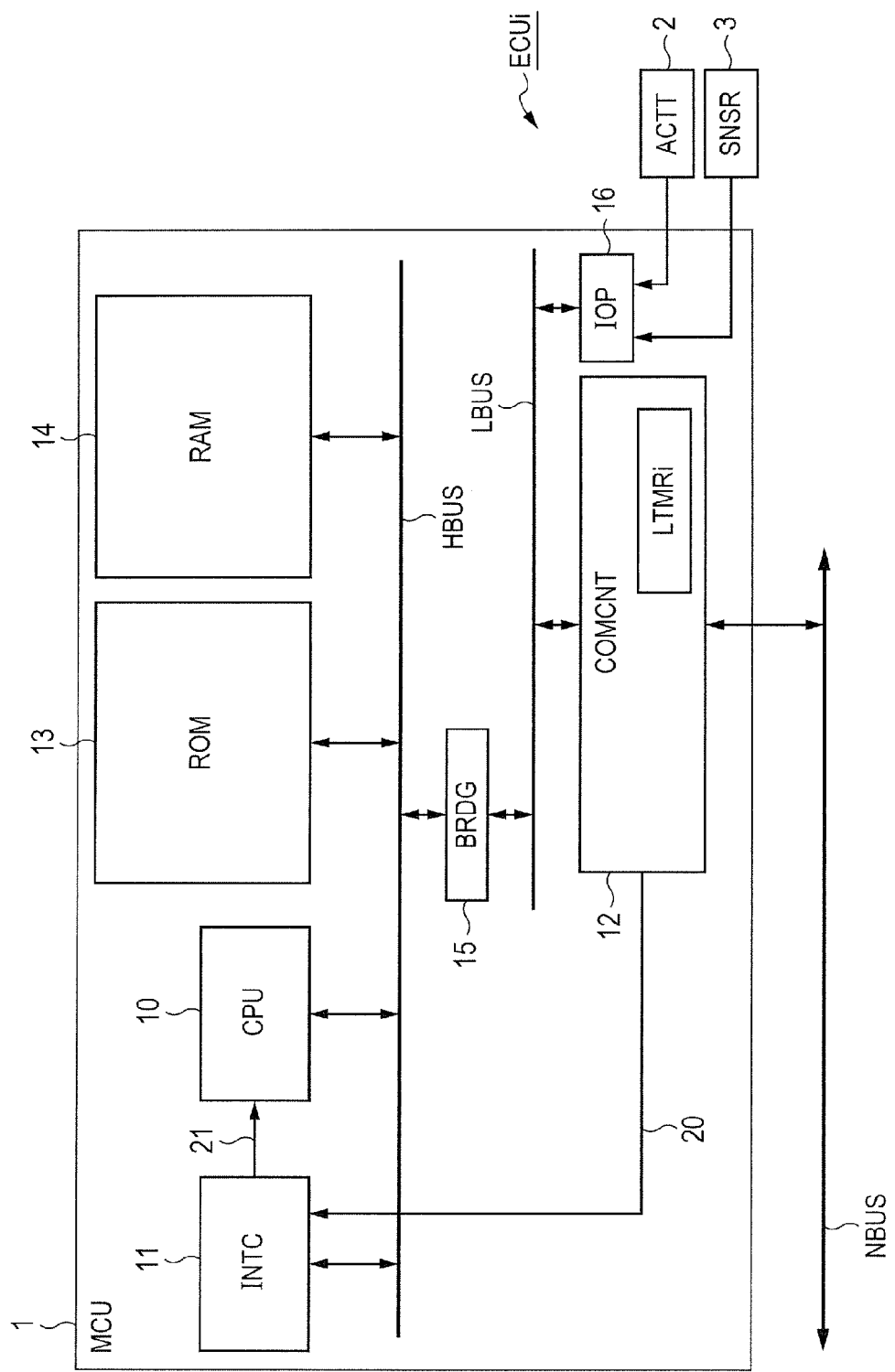
FIG. 5 is a block diagram showing a configuration of a microcomputer used as an example of a semiconductor data processing device applied to an electronic control unit.

FIG. 5 shows an example configuration of a microcomputer (MCU) applied to the electronic control unit ECUi. The microcomputer 1 is formed over, though not limited to, a single semiconductor substrate, for example, a monocrystal silicon substrate using CMOS integrated circuit fabrication technology. The microcomputer includes a central processing unit (CPU) 10 to execute commands, a ROM 13 to store programs to be executed by the CPU 10 and control data, a RAM 14 to be used, for example, as a work area for the CPU 10, and an interrupt control circuit (INTC) 11 which are coupled to a high-speed bus HBUS for interfacing. The high-speed bus HBUS is interfaced to a low-speed bus LBUS via a bus bridge circuit (BRDG) 15. A communication control circuit (COMCNT) 12 and an I/O port (IOP) 16 which are representatively shown in FIG. 5 are coupled to the low-speed bus LBUS. The communication control circuit 12 is coupled with the network bus NBUS. The I/O port 16 is coupled with an actuator (ACTT) 2 and a sensor (SNSR) 3 to be controlled by the electronic control unit.

The communication control circuit 12 controls transmission/reception performed, using the time-triggered communication protocol, with other electronic control units coupled to the network bus NBUS. The communication control circuit 12 has the local time timer LTMRi used for time-triggered communication and generates a timer interrupt request 20 for time-triggered communication based on time counting by the local time timer LTMRi.

The interrupt control circuit 11 performs interrupt control to have the CPU 10 execute interrupt processing responding to interrupt requests received from both inside and outside the microcomputer 1. In FIG. 5, other timer interrupt requests than the timer interrupt request 20 are omitted. The interrupt control circuit 11 has a feature that, when a timer interrupt request 20 for time-triggered communication is received, it performs control to delay, by a predetermined reservation time, starting of interrupt processing to be performed by the CPU 10 responding to the timer interrupt request 20. Reference numeral 21 in FIG. 5 denotes an interrupt command which the interrupt control circuit 11 sends to the CPU 10 in response to the interrupt request 20. In the following, the configuration related with timer interrupt control for time-triggered communication will be described in detail centering on the above feature of the interrupt control circuit 11.

<Timer Interrupt Control for Time-Triggered Communication>

Figure 6:
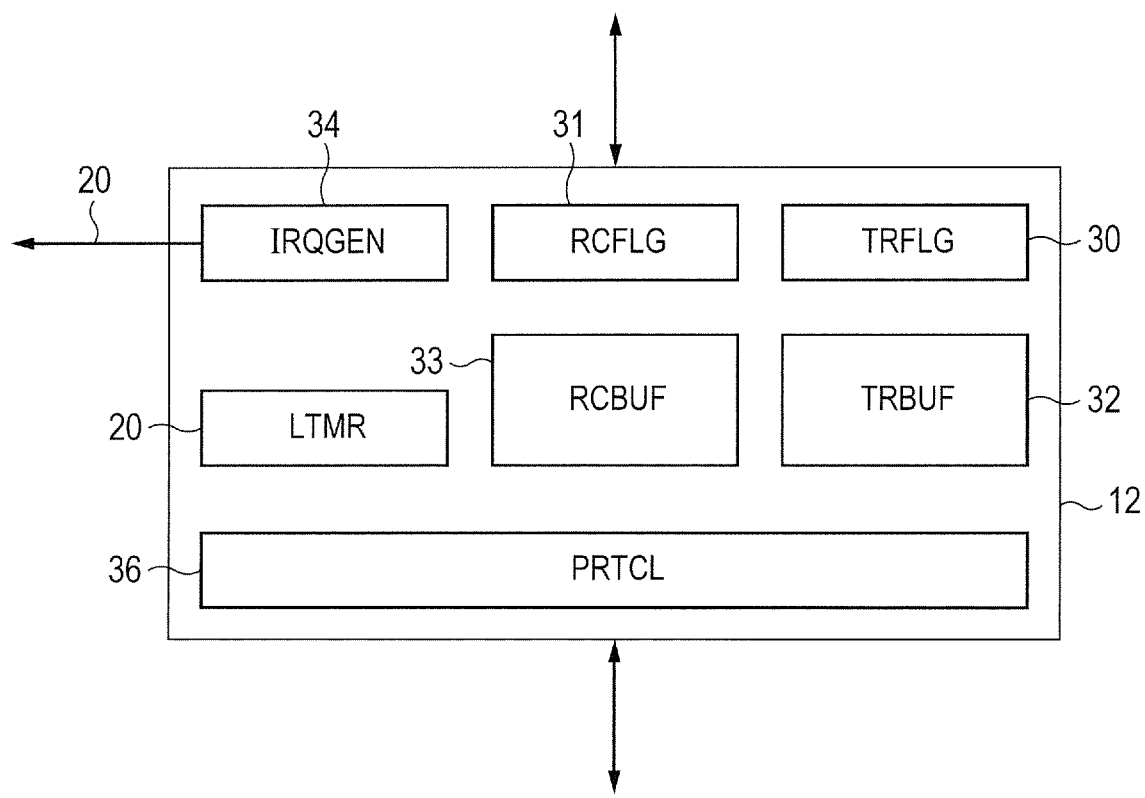
FIG. 6 is a block diagram showing a detailed example configuration of a communication control circuit.

FIG. 6 shows a detailed configuration of the communication control circuit 12. The communication control circuit 12 has a local time timer (LTMR) 35 for time-triggered communication. Based on time counting by the local time timer 35, the interrupt generation circuit (IRQGEN) 34 generates a timer interrupt request 20. The communication control circuit 12 accumulates data (packets and messages) received from the network bus NBUS in a reception buffer (RCBUF) 33 and, when the reception is completed, a reception completion flag (RCFLG) 31 is set. When the data accumulated in the reception buffer 33 is transmitted to the RAM 14, the reception completion flag 31 is reset. Data to be transmitted to the network bus NBUS is transferred from the RAM 14 to a transmission buffer 32. When the transfer is completed, a transmission request flag 30 is set. When the transmit data is transmitted from the transmission buffer 32 to the network bus NBUS, the transmission request flag 30 is reset. The procedures for controlling the buffers 32 and 33, setting a local time on the local time timer 35, and performing the offset control and rate control for the local time timer are controlled by a protocol controller (PRTCL) 36. The control may be either programmed control or hardwired logic control. Though not necessarily, a clock generation circuit to generate count clock signals of the macrotick counter is provided in the local time timer 35.

Figure 7:
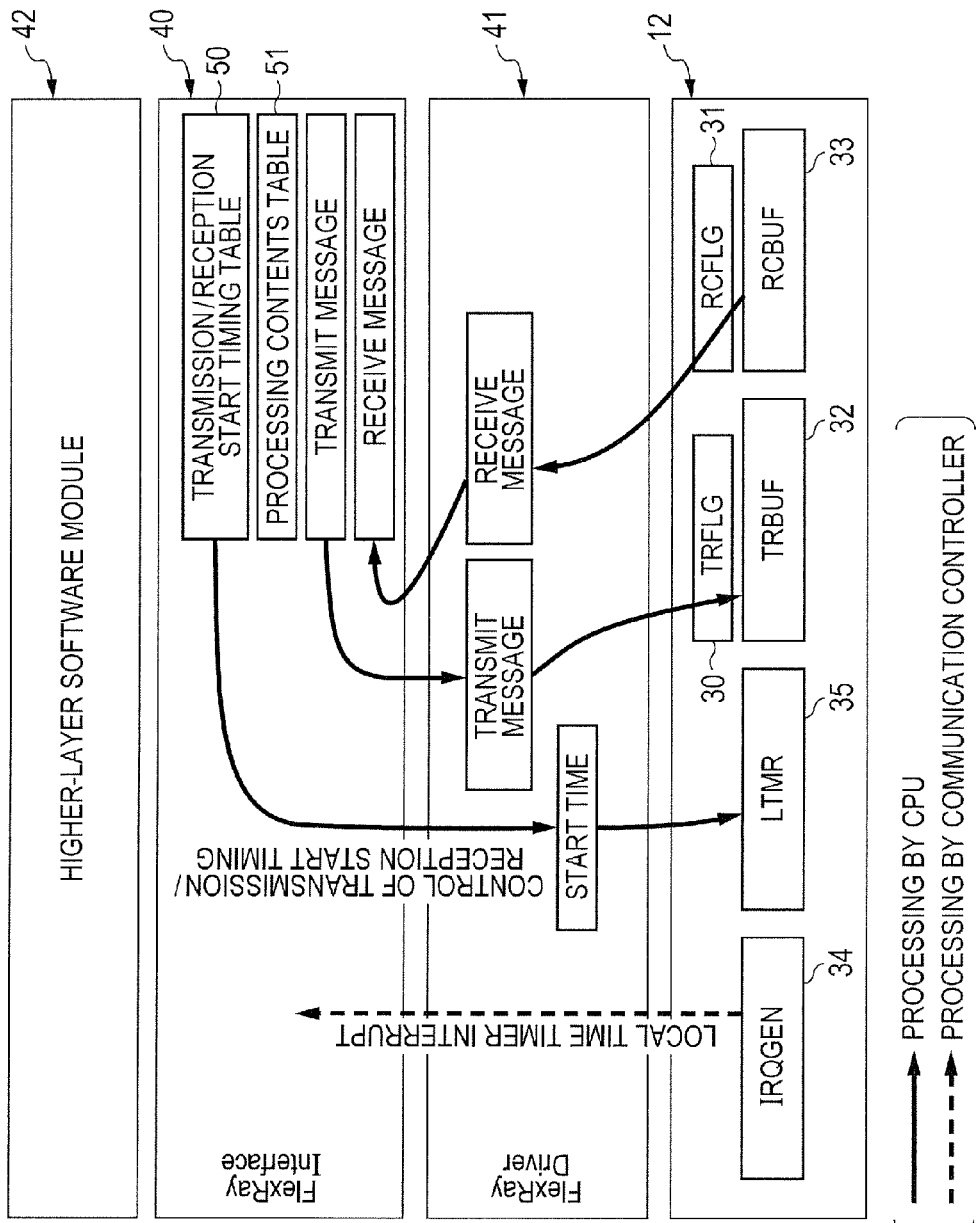
FIG. 7 is an explanatory diagram showing an example hierarchical structure of software modules based on the AUTOSAR standard.

FIG. 7 shows an example hierarchical structure of software modules based on the AUTOSAR standard. According to the AUTOSAR standard that is a vehicle-mounted software platform standard, software to deal with FlexRay is hierarchized into two software modules, i.e. FlexRay interface 40 and FlexRay driver 41, having the functions as described below.

The FlexRay interface 40 has a transmission/reception start timing table 50 in which a communication schedule is written and a processing contents table 51 in which the processing to be performed at each timing is described. The FlexRay interface 40 controls the timing of starting transmission/reception to be performed when a timer interrupt (local time timer interrupt) occurs based on the local time timer 35 and also controls the contents of the transmission/reception processing. Also, the FlexRay interface 40 performs data exchanges between the FlexRay driver and higher-layer software modules.

The FlexRay driver 41 performs accessing the communication control circuit 12 functioning as a FlexRay controller, processing to store a transmit message given from the FlexRay interface 40 in the transmission buffer 32 and processing to take out a receive message from the reception buffer 33 and deliver the receive message to the FlexRay interface 40. In the present embodiment, though a different method is also allowable, transmission/reception start timing is controlled by setting start time data given by the transmission/reception start timing table 50 included in the FlexRay interface 40 on the local time timer 35 via the FlexRay driver 41. When a local time timer interrupt is outputted from the interrupt generation circuit 34 based on time counting by the local time timer under the timing control performed as described above, the FlexRay interface 40 realizes processing defined in the processing contents table 51 by using a higher-layer software module. Thus, based on the transmission/reception start timing table, each electronic control unit can transmit/receive frames or messages at timing synchronized with elapse of the local time set on the local time timer.

<Interrupt Command Delaying Control Based on Interrupt Reservation Time>

Figure 8:
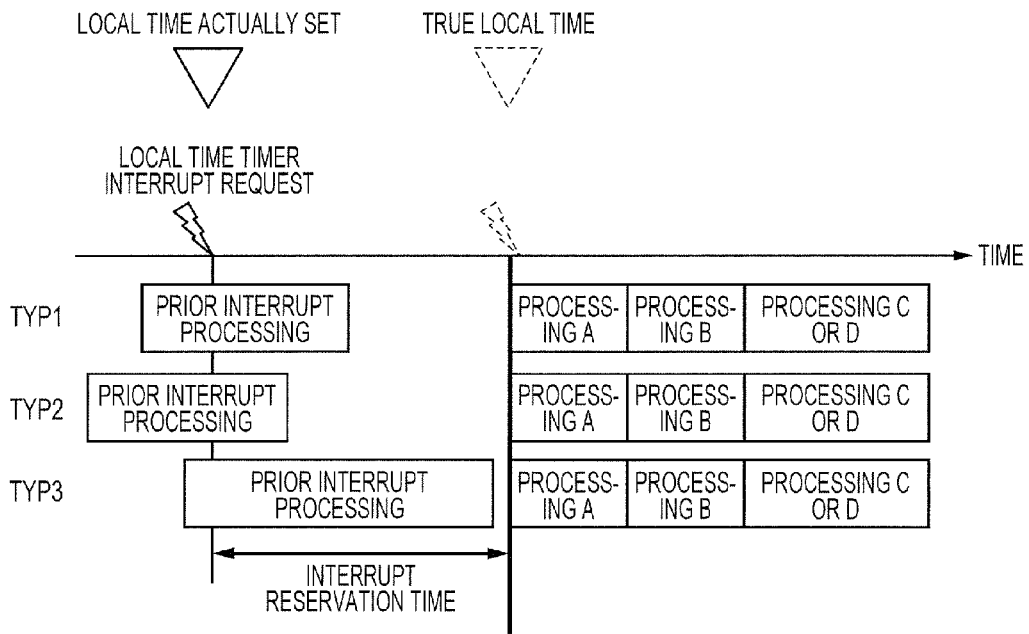
FIG. 8 is a timing chart showing a typical format of control performed when an interrupt command is issued responding to a timer interrupt request for time-triggered communication.

Next, the control performed by the interrupt control circuit 11 responding to a timer interrupt request 20 for time-triggered communication will be described. FIG. 8 shows a typical format of control performed when an interrupt command is issued responding to a timer interrupt request 20 for time-triggered communication. In FIG. 8, processings A to D represent the interrupt processings (also referred to as "specific interrupt processings") performed by the CPU 10 responding to timer interrupt requests 20 for time-triggered communication. Processing A is for setting next local time on the local time timer based on the transmission/reception timing table. Processing B is for processing contents allocation based on the processing contents table. Processing C is transmission processing. Processing D is reception processing.

Figure 9:
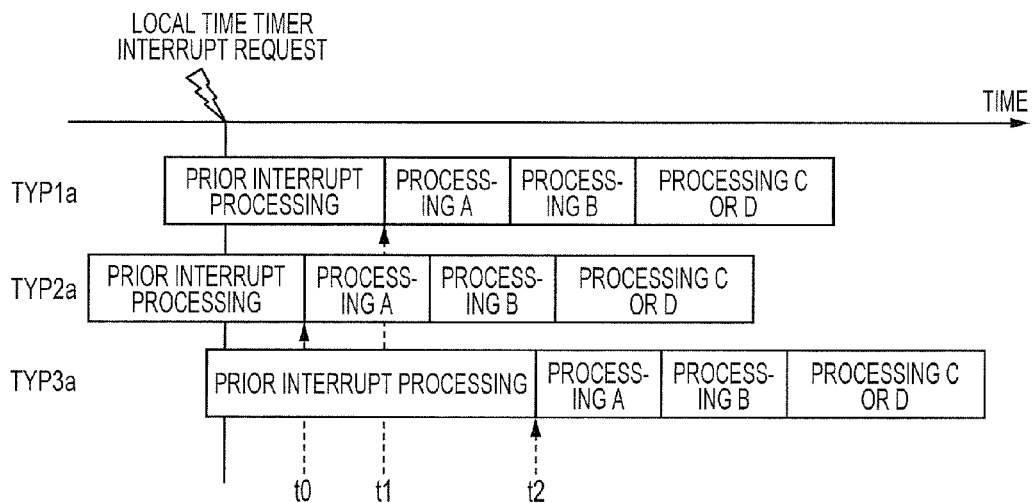
FIG. 9 is a timing chart for interrupt processing control performed in a case where interrupt timing control using an interrupt reservation time is not performed.

When a timer interrupt request for time-triggered communication (a specific interrupt request) 20 is received, the interrupt control circuit 11 outputs, after elapse of a predetermined reservation time (also referred to as an "interrupt reservation time"), an interrupt command 21 for starting interrupt processing (also referred to simply as a "specific interrupt command") to the CPU 10 that is to perform interrupt processing corresponding to the timer interrupt request 20. For interrupt reservation time management, though not limited to, a timer, not shown, which counts elapse of the interrupt reservation time in response to a specific interrupt request 20 is used. Therefore, as illustrated as operation types TYP1, TYP2 and TYP3 in FIG. 8, even if the CPU 10 is processing a prior interrupt request when a specific interrupt request 20 is received, a specific interrupt command 21 is generated after elapse of an interrupt reservation time regardless of the state of the prior interrupt processing. This stabilizes the time when the specific interrupt processing is started. In cases where, as shown in FIG. 9, the timing of generating a specific interrupt command is not controlled using an interrupt reservation time, it may occur that the specific interrupt processing is started only after completion of a prior interrupt processing. This can occur, for example, when multiple, interrupt processing is inhibited or when a prior interrupt processing is one started responding to a high-priority interrupt request. In such a case, the time when a specific interrupt processing is started can vary between operation types as indicated by times t0, t1 and t2 in FIG. 9.

It will be appropriate to set an interrupt reservation time to be long enough to absorb the differences between the times when different prior interrupt processings are completed. Such an interrupt reservation time is required to be longer than a maximum time taken to complete a prior interrupt processing regardless of its type.

Also, setting the local time timer 35 to a time which is ahead, by an interrupt reservation time, of the target time for starting interrupt processing will prevent the timing of transmission/reception processing from being generally delayed. Namely, the specific interrupt processing can be started at the originally targeted local time.

Thus, it can be made easy to cause the CPU 10 to start, at a predetermined timing, interrupt processing responding to a timer interrupt request for time-triggered communication regardless of the condition of preceding data processing being performed by the CPU 10. It is, therefore, possible to control time-triggered communication in which terminals coupled to a network perform transmission/reception operation in synchronization with a common time used in the network without causing a predetermined time schedule to be widely deviated from.

Figure 10:
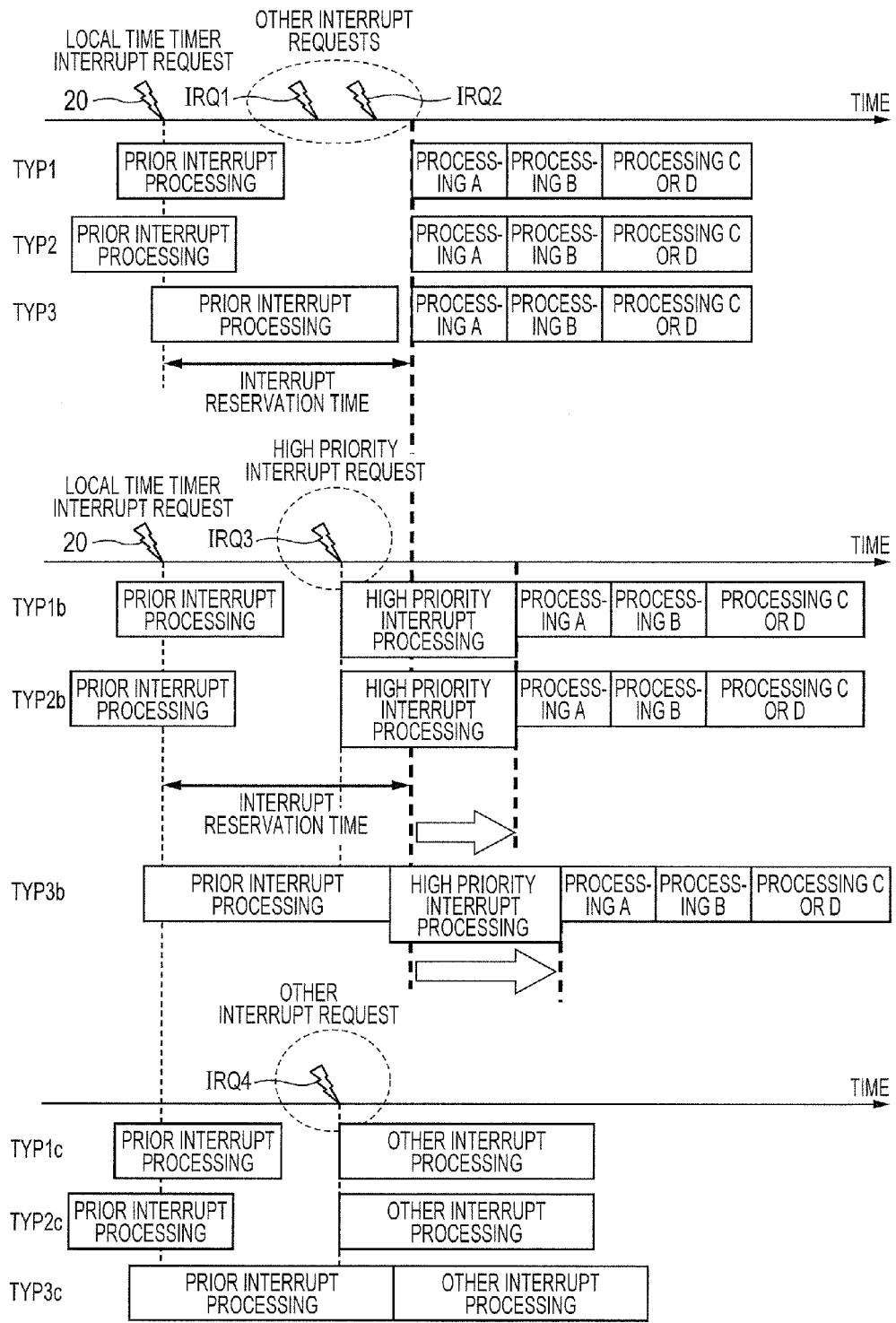
FIG. 10 is a timing chart showing example modes of control performed when another interrupt request is generated during an interrupt reservation time.

FIG. 10 shows example modes of control performed when another interrupt request is generated during an interrupt reservation time. When another interrupt request is received during the interrupt reservation time for the last specific interrupt request, the interrupt control circuit 11 causes the CPU 10 to start, after elapse of the interrupt reservation time, processing the one higher in interrupt priority level between the specific interrupt request and the subsequently received interrupt request.

Referring to FIG. 10, in each of the operation types TYP1, TYP2 and TYP3, interrupt requests IRQ1 and IRQ2 are successively generated during the interrupt reservation time entered following a specific interrupt request 20. In this example, the interrupt priority levels of the interrupt requests IRQ1 and IRQ2 are lower than the interrupt priority level of the specific interrupt request 20, so that, after elapse of the interrupt reservation time, the CPU 10 starts interrupt processing responding to the specific interrupt request 20. Though not particularly shown, when the specific interrupt processing is completed, the interrupt priority levels of outstanding interrupt requests including IRQ1 and IRQ2 are determined, then the outstanding interrupt requests are processed according to their interrupt priority levels thus determined. Therefore, if a subsequent specific interrupt request 20 is generated before the prior specific interrupt processing is completed, the subsequent specific interrupt request 20 is processed with priority over the interrupt requests IRQ1 and IRQ2.

In each of the operation types TYP1b, TYP2b and TYPE3b shown in FIG. 10, before the interrupt reservation time for the specific interrupt request 20 elapses, another interrupt request IRQ3 is generated. In this example, the interrupt priority level of the interrupt request IRQ3 is higher than that of the specific interrupt request 20, so that, based on the results of determining the interrupt priority levels of the outstanding interrupt requests during the interrupt reservation time, the CPU 10 performs high-priority interrupt processing corresponding to the interrupt request IRQ3 before the specific interrupt request 20 whose priority level is lower than that of the interrupt request IRQ3. When the high-priority interrupt processing is completed, the priority levels of the outstanding interrupt requests including the specific interrupt request 20 are determined again and the outstanding interrupt requests are processed according to their interrupt priority levels. Since, in the operation types TYPE1b, TYP2b and TYPE3b, while the high-priority interrupt processing is performed, no additional high-priority interrupt request is generated. Therefore, immediately after completion of the high-priority interrupt processing, the specific interrupt processing (including processing A, processing B and processing C) corresponding to the specific interrupt request 20 is performed. In this example, an operation mode inhibiting multiple interrupt processing is employed, so that, even when an additional interrupt request is generated while the CPU 10 is engaged in interrupt processing, the CPU 10 cannot start processing the additional interrupt request. Therefore, as shown as operation type TYP3b in FIG. 10, even when the high-priority interrupt request signal IRQ3 is generated while prior interrupt processing is taking place, the high-priority interrupt processing corresponding to the high-priority interrupt request IRQ3 cannot be started until completion of the prior interrupt processing.

When, as shown as operation types TYP1c, TYP2c and TYP3c in FIG. 10, an interrupt request IRQ4 which is not a specific interrupt request is generated while no specific interrupt request 20 is generated, the interrupt control circuit 11 determines the interrupt priority levels of the outstanding interrupt requests including IRQ4 and causes the outstanding interrupt requests to be processed according to their interrupt priority levels. In this example, too, as in the above example, an operation mode inhibiting multiple interrupt processing is employed, so that, even when the new interrupt request IRQ4 is generated while the CPU 10 is engaged in interrupt processing as in operation type TYP3c, the CPU 10 cannot start processing the new interrupt request until completion of the prior interrupt processing.

Since interrupt processing is performed with priority on interrupt requests higher in priority level than the specific interrupt request 20, a high-priority interrupt request such as for error processing is processed before a timer interrupt request for time-triggered communication. In this way, recovery processing following a system error can be smoothly carried out without being affected by a timer interrupt request for time-triggered communication, so that system security is ensured. Also, with multiple interrupt processing inhibited, possible irregularity in transmission/reception processing can be reduced.

<Specific Interrupt Processing Involving Access to Low-Speed Bus by CPU>

Figure 11:
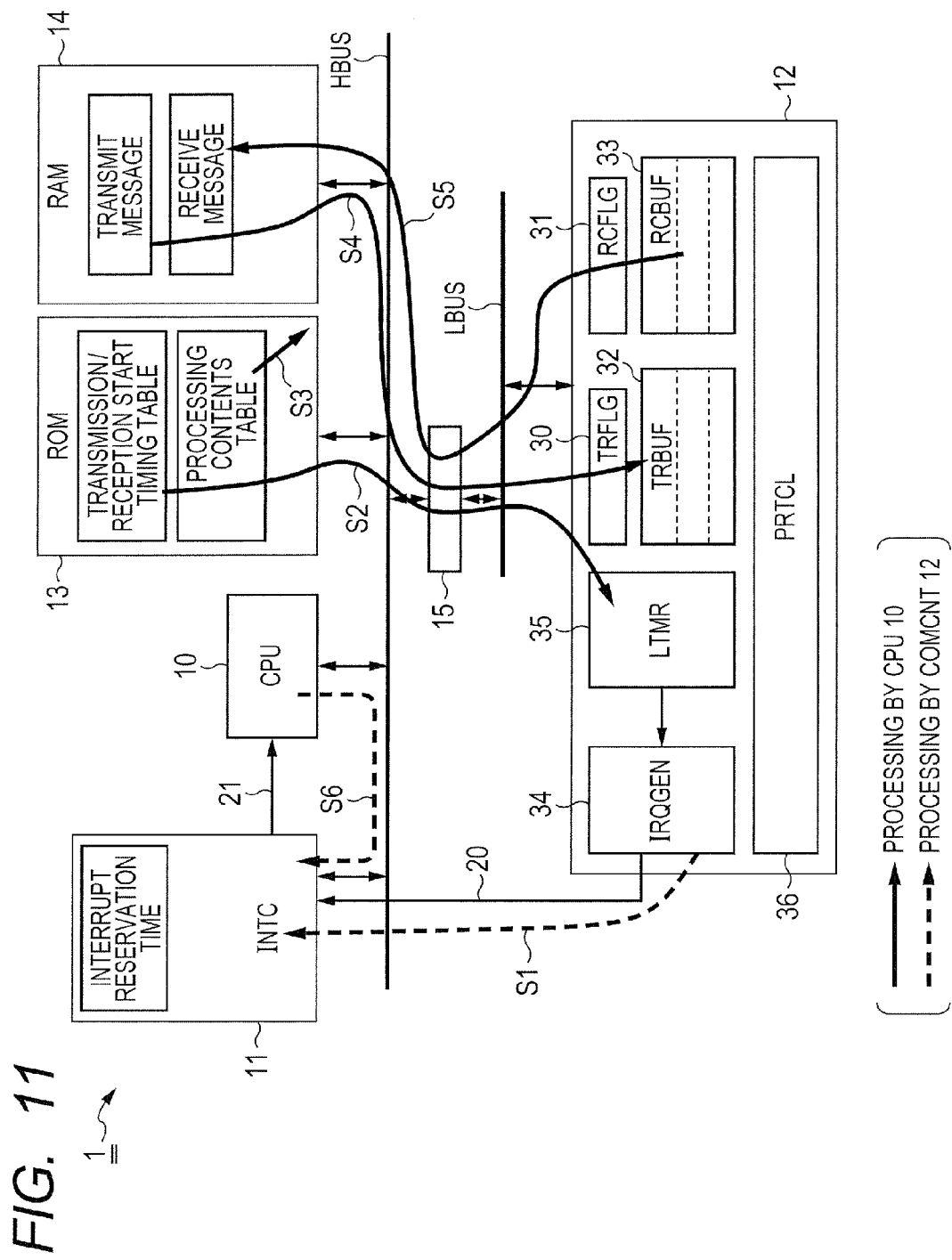
FIG. 11 is an explanatory diagram schematically showing a flow of specific interrupt processing mainly performed by a CPU having the microcomputer shown in FIG. 5.
Figure 12:
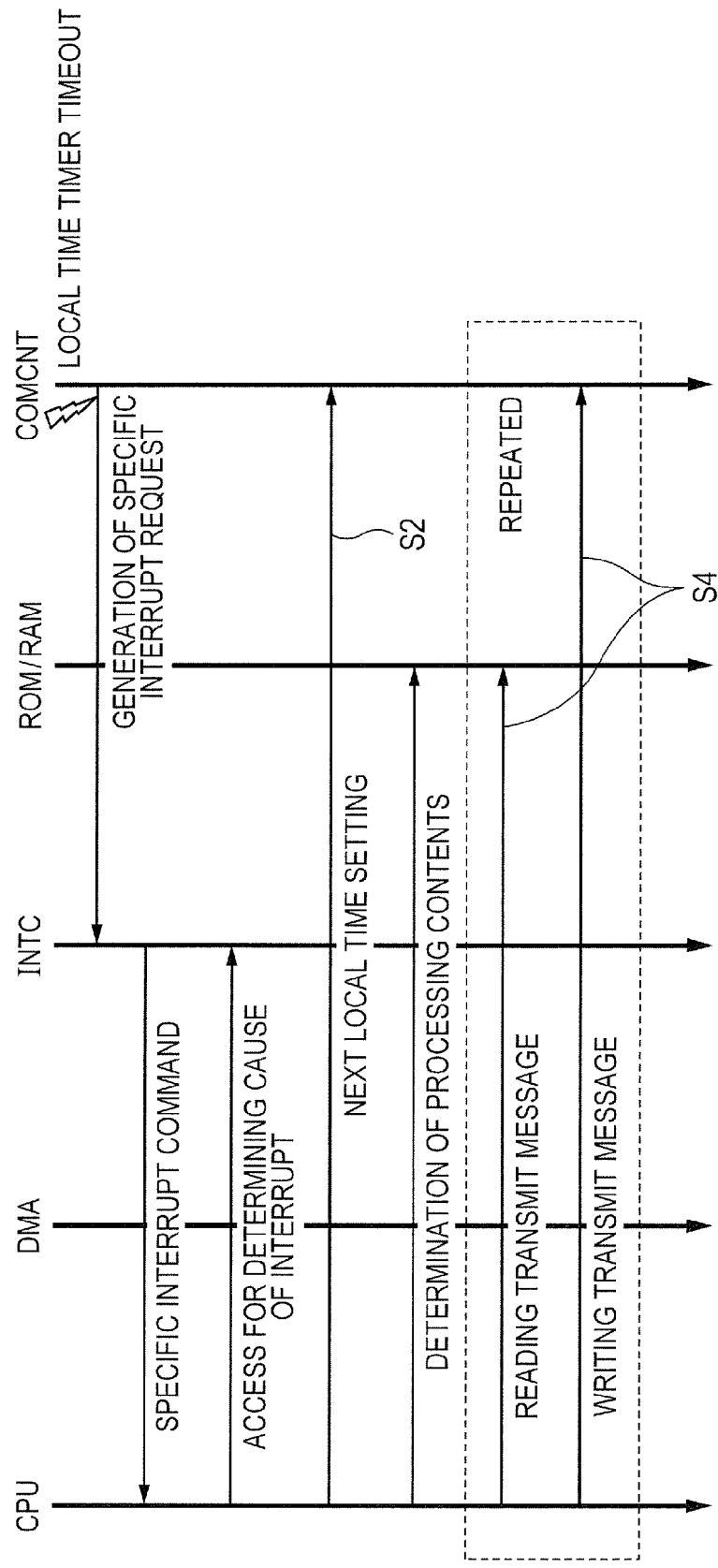
FIG. 12 shows example operation timing for transmission processing performed as specific interrupt processing.
Figure 13:
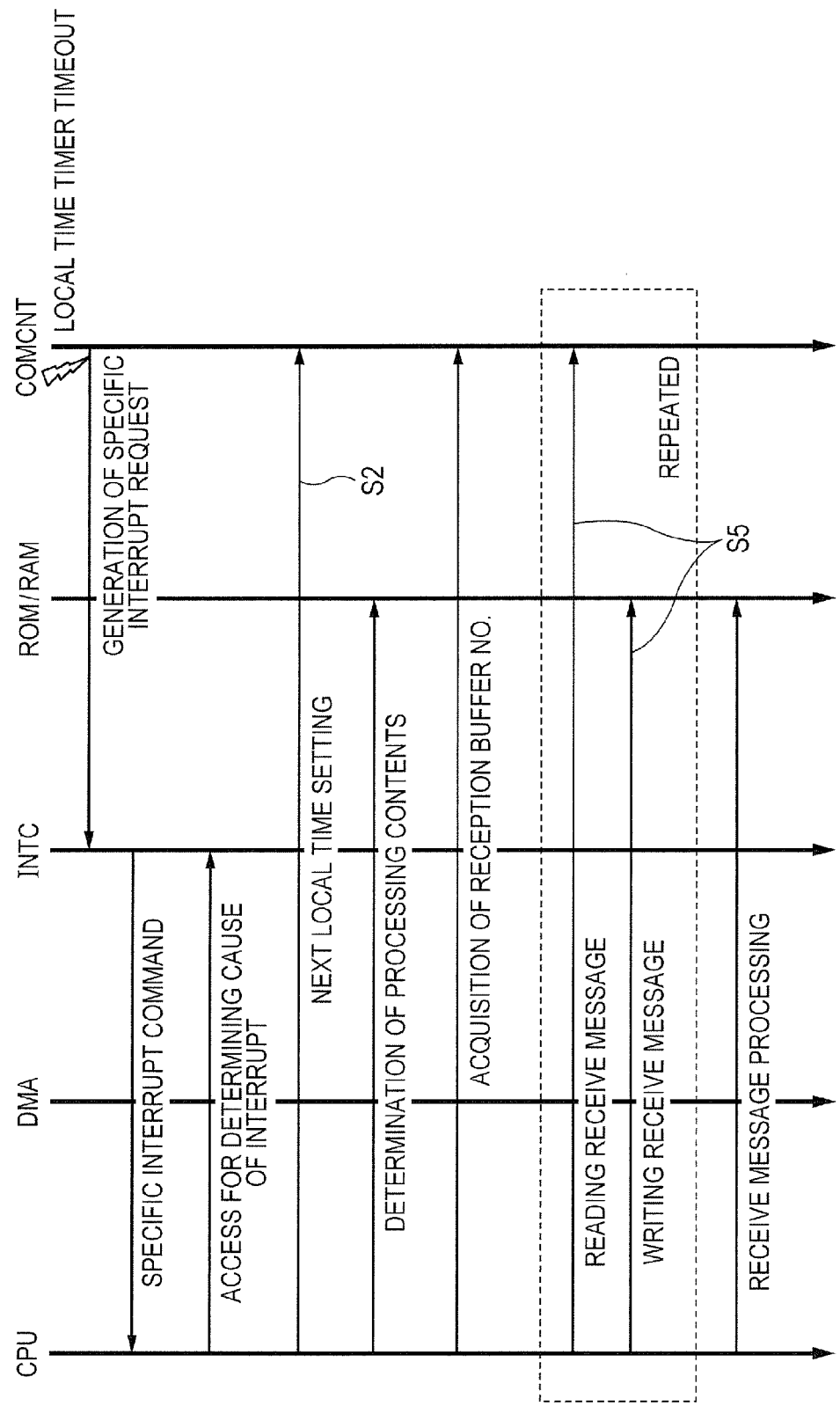
FIG. 13 shows example operation timing for reception processing performed as specific interrupt processing.

FIG. 11 schematically shows a flow of specific interrupt processing mainly performed by a CPU having the microcomputer 1 shown in FIG. 5. FIG. 12 shows example operation timing for transmission processing performed as specific interrupt processing. FIG. 13 shows example operation timing for reception processing performed as specific interrupt processing.

As schematically shown in FIG. 11, when a specific interrupt request 20 is generated (S1), specific interrupt processing is performed in response. In the specific interrupt processing, the CPU 10 accesses the interrupt control circuit 11 and determines the cause of the interrupt (S6). Next, to set the timing of generating a specific interrupt request, the CPU 10 sets local time data selected from the transmission/reception start timing table on the local time timer 35 (S2). The CPU 10 then determines the contents of the processing contents table (S3) and, when the contents of the processing contents table are determined to specify transmission processing, the CPU 10 transfers the transmit message stored in the RAM 14 to the transmission buffer 32 and sets a transmission flag 30 (S4). When the contents of the processing contents table are determined to specify reception processing, the CPU 10 transfers the receive message stored in the reception buffer 33 to the RAM 14 and resets a reception flag 31 (S5). The processing performed as S2, S4 and S5 involves access to the low-speed bus LBUS by the CPU 10, so that the CPU 10 is subjected to a heavy load.

In the case of transmission processing, as shown in FIG. 12, next local time setting is included in processing S2, and reading and writing of a transmit message are included in transfer processing S4. In transmission processing, according to the determined contents of processing, the CPU 10 repeats a predetermined number of times reading, from the RAM 14, a transmit message generated and written to the RAM 14 by the higher-layer software module 42 and writing the transmit message to the transmission buffer 32 included in the communication control circuit 12 (S4).

In the case of reception processing, as shown in FIG. 13, next local time setting is included in processing S2, and reading and writing of a receive message are included in transfer processing S5. In reception processing, according to the determined contents of processing, the CPU 10 repeats a predetermined number of times reading a receive message received in the reception buffer 33 and writing the receive message to the RAM 14 (S5). The CPU 10 processes the receive message written to the RAM 14 by executing the higher-layer software module 42.

As shown in FIGS. 11 to 13, processing S2 in which the CPU 10 sets local time data selected from the transmission/reception start timing table on the local time timer 35, processing S4 in which, for transmission processing, the transmit message stored in the RAM 14 is transferred to the transmission buffer 32, and processing S5 in which, for reception processing, the receive message held in the reception buffer 33 is transferred to the RAM 14 require the CPU 10 to access the low-speed bus LBUS resulting in an increased load on the CPU 10. However, the contents of such processing can be flexibly defined by processing programs and the processing can be flexibly changed.

<Cause of Interrupt Pushed to CPU Together with Interrupt Signal>

Figure 14:
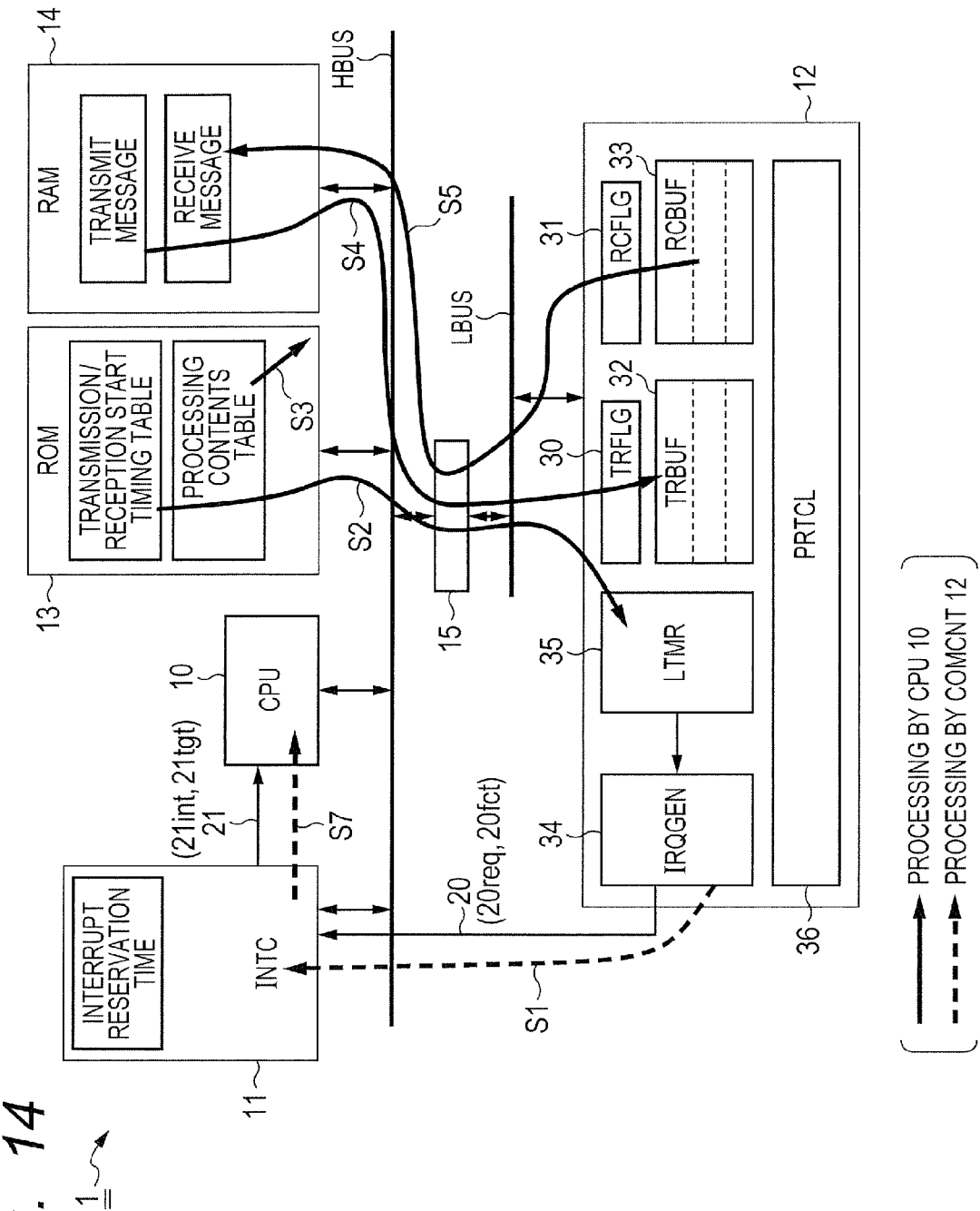
FIG. 14 is a block diagram showing a configuration in which an interrupt control circuit pushes the cause of an interrupt to the CPU together with an interrupt signal.

FIG. 14 shows a configuration in which the interrupt control circuit 11 pushes the cause of an interrupt to the CPU 10 together with an interrupt signal. Referring to FIG. 14, the communication control circuit 12 outputs, as a timer interrupt request 20, a timer interrupt request signal 20*req* and an interrupt cause signal 20*fct* indicating the cause of the timer interrupt request signal 20*req* to the interrupt control circuit 11. In response to the timer interrupt request signal 20*req* and the interrupt cause signal 20*fct* the interrupt control circuit 11 outputs an interrupt signal 21*int* and interrupt cause data 21*tgt* which is required for branching to interrupt processing to the CPU 10. In other respects, the configuration shown in FIG. 14 is similar to that shown in FIG. 11, so that detailed description will be omitted.

Figure 15:
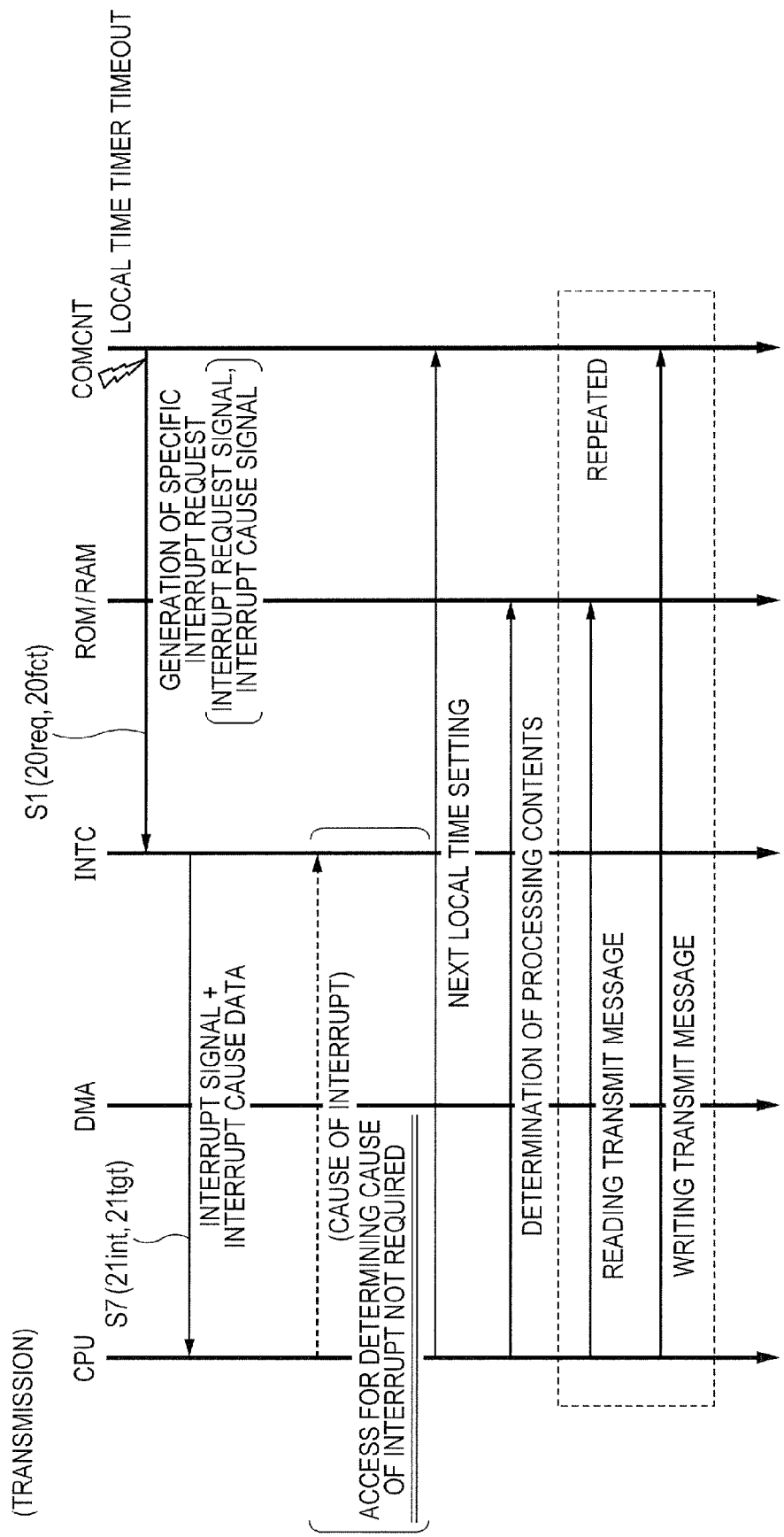
FIG. 15 is a timing chart showing example operation timing for transmission processing shown in FIG. 14.
Figure 16:
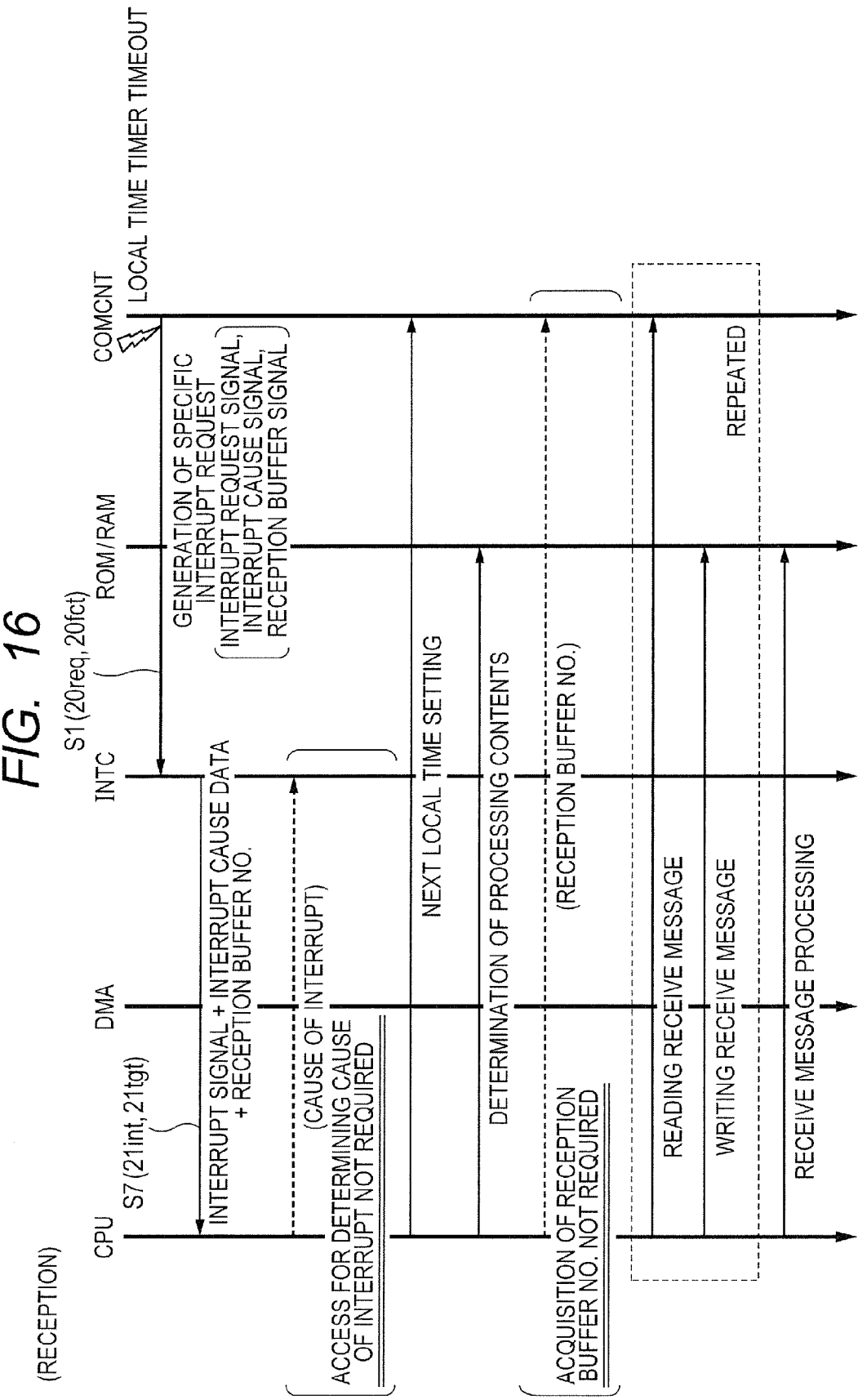
FIG. 16 is a timing chart showing example operation timing for reception processing shown in FIG. 14.

Referring to the configuration shown in FIG. 14 and also referring to FIG. 15 showing the operation timing for transmission processing and FIG. 16 showing the operation timing for reception processing, in processing S1, the communication control circuit 12, responding to a timeout of the local time timer 35, outputs a timer interrupt request signal 20*req* and an interrupt cause signal 20*fct* indicating the cause of the timer interrupt request signal 20*req* to the interrupt control circuit 11. When the interrupt reservation time elapses, the interrupt control circuit 11 outputs an interrupt signal 21*int* for responding, to the interrupt request and cause data 21*tgt* which is required for branching to interrupt processing to the CPU 10. Therefore, the CPU 10 is not required to perform processing S6 in which, as described with reference to FIGS. 11 to 13, the CPU 10 determines the cause of interrupt by accessing, for example, an interrupt cause register included in the interrupt control circuit 11. In reception processing, as shown in FIG. 16, it can be made unnecessary to obtain the reception buffer No. indicating the buffer storing the receive message from the communication control circuit 12.

Therefore, the load due to interrupt processing on the CPU 10 can be reduced. This contributes toward reducing the time taken for interrupt processing by the CPU 10 and improving the efficiency of communication processing in time-triggered communication.

<Control of Transmit/Receive Data Transfer by DMAC>

Figure 17:
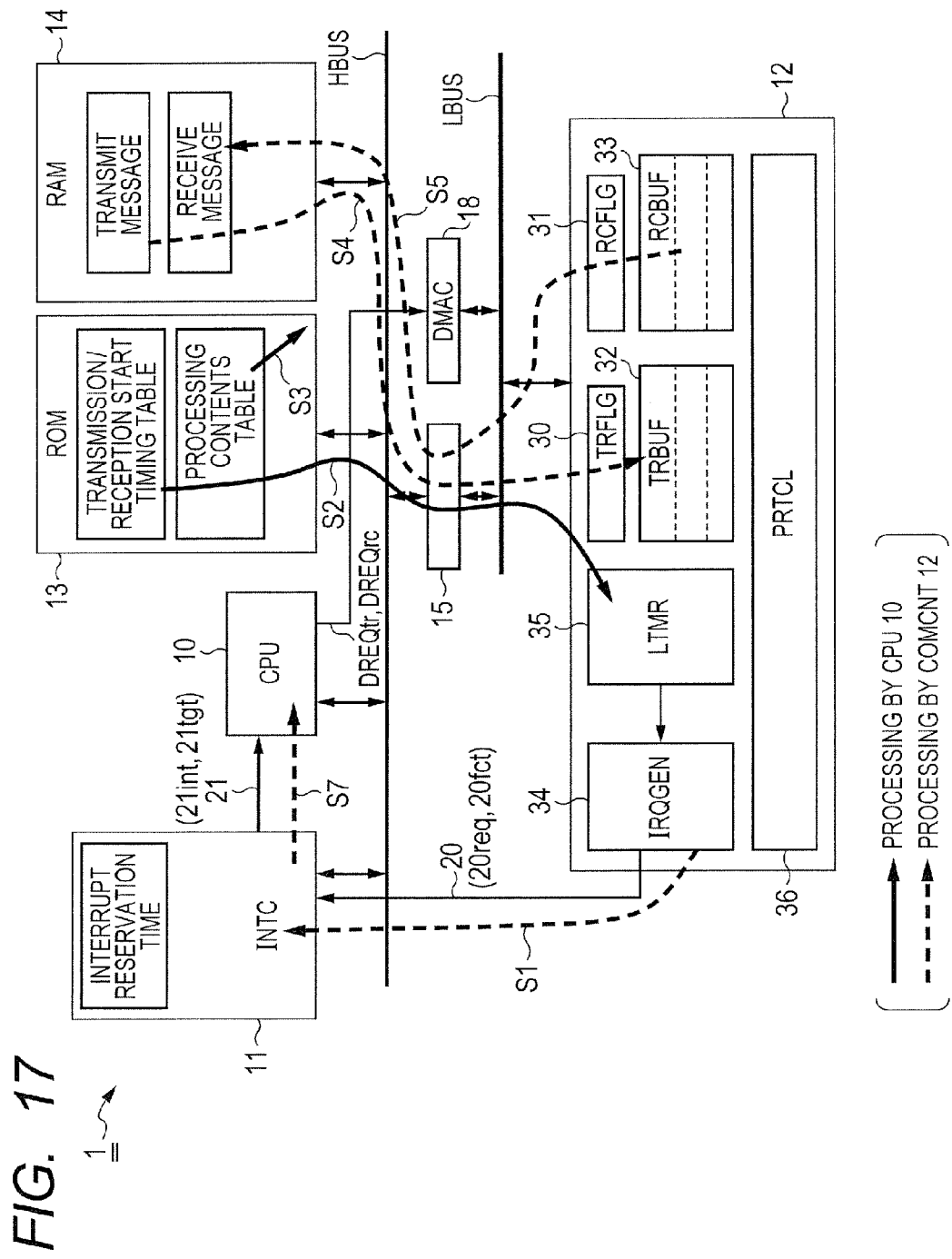
FIG. 17 is a block diagram showing an example microcomputer configuration in which transmit/receive data is transferred between a RAM and the communication control circuit using a DMAC.

FIG. 17 shows an example microcomputer configuration in which transmit/receive data is transferred between the RAM and the communication control circuit using a DMA transfer control function. In this configuration, the low-speed bus LBUS is provided with a direct memory access controller (DMAC) 18 as a data transfer control device and the conditions for transfer control are set beforehand by the CPU 10. When a transfer start request is received, the DMAC 18 starts transfer operation complying with the preset conditions. In this example, the CPU 10 sets transfer control information for controlling a transmit message transfer from the RAM 14 to the transmission buffer 32 on a transfer channel for transmission. Also, the CPU 10 sets transfer control information for controlling a receive message transfer from the reception buffer 33 to the RAM 14 on a transfer channel for reception. In other respects, the configuration shown in FIG. 17 is similar to the foregoing configuration, so that detailed description will be omitted.

Figure 18:
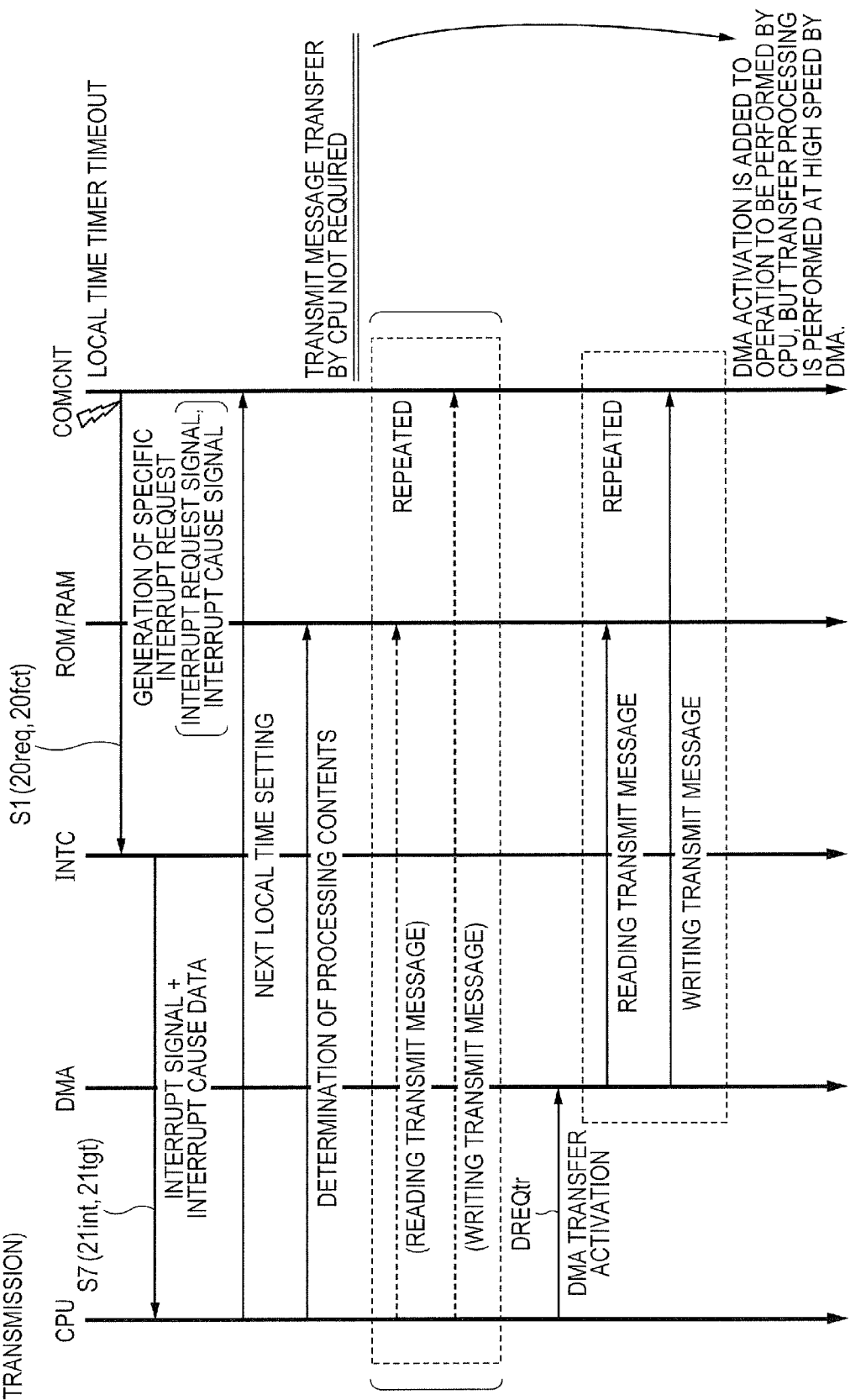
FIG. 18 is a timing chart showing example operation timing for transmission processing performed using the DMAC as shown in FIG. 17.

As shown in FIG. 18, when an interrupt signal 21*int* and cause data 21*tgt* corresponding to a timer interrupt request 20 for time-triggered communication are received and the processing corresponding to the interrupt cause is transmission processing, the CPU 10 activates a DMA transfer start signal DREQtr for the transfer channel for transmission and causes the DMAC 18 to transmit the transmit message stored in the RAM 14 to the transmission buffer 32 included in the communication control circuit 12.

Figure 19:
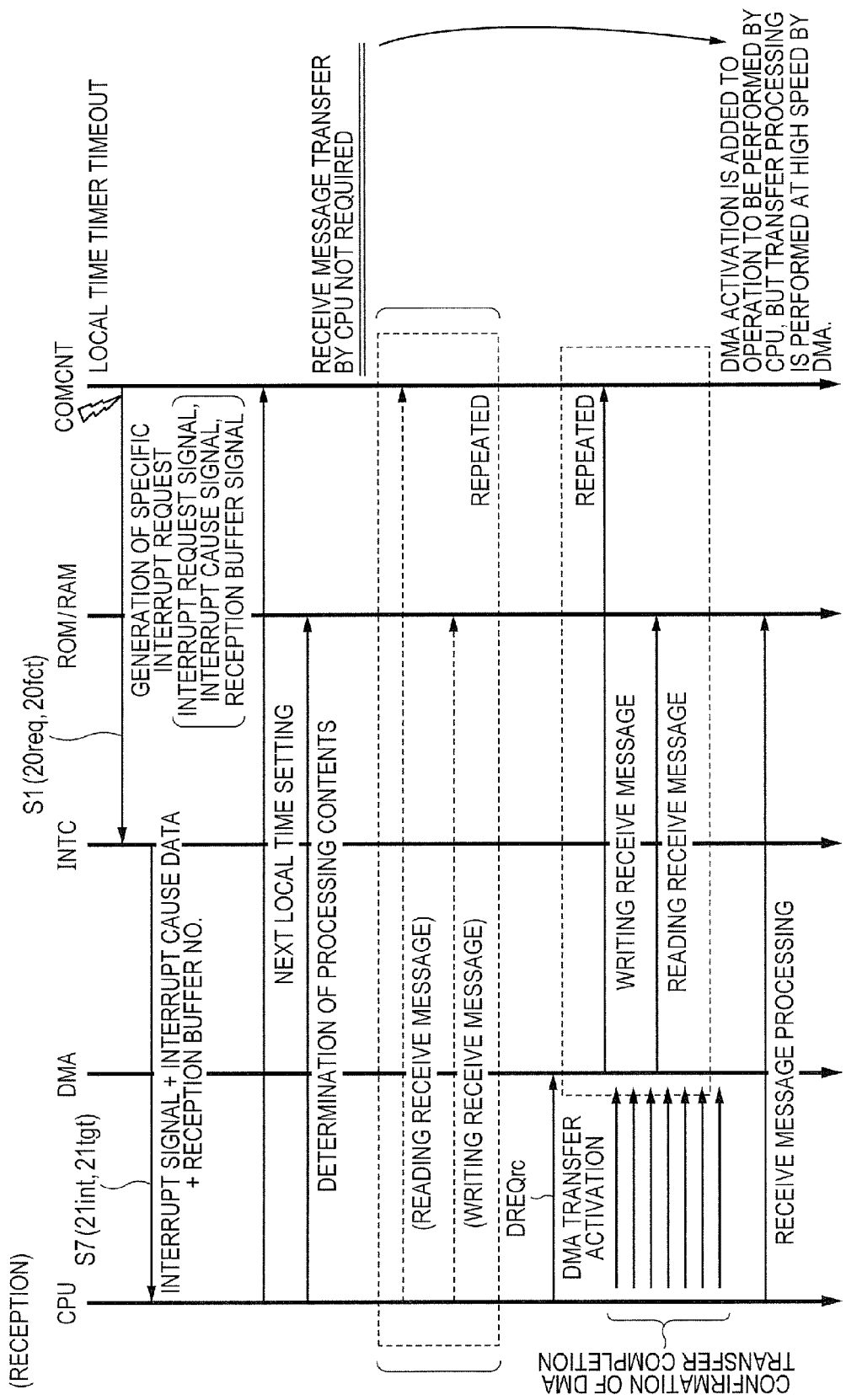
FIG. 19 is a timing chart showing example operation timing for reception processing performed using the DMAC as shown in FIG. 17.

As shown in FIG. 19, when an interrupt signal 21*int* and cause data 21*tgt* corresponding to a timer interrupt request 20 for time-triggered communication are received and the processing corresponding to the interrupt cause is reception processing, the CPU 10 activates a DMA transfer start signal DREQrc for the transfer channel for reception and causes the DMAC 18 to transmit the receive Message stored in the reception buffer 33 included in the communication control circuit 12 to the RAM 14.

In this way, when performing interrupt processing for transmission responding to a timer interrupt request, the CPU 10 is not required to perform data access operation for transferring the transmit message from the RAM 14 to the transmission buffer 32 included in the communication control circuit 12. Similarly, when performing interrupt processing for reception responding to a timer interrupt request, the CPU 10 is not required to perform data access operation for transferring the receive message from the reception buffer 33 included in the communication control circuit 12 to the RAM 14. Thus, the DMAC 18 realizes efficient data transfer. Therefore, the load due to interrupt processing on the CPU 10 can be reduced. This contributes toward reducing the time taken for interrupt processing by the CPU 10 and improving the efficiency of communication processing in time-triggered communication.

<Control of Transmit/Receive Data Transfer Using Bus-Access Function of Communication Control Circuit 12>

Figure 20:
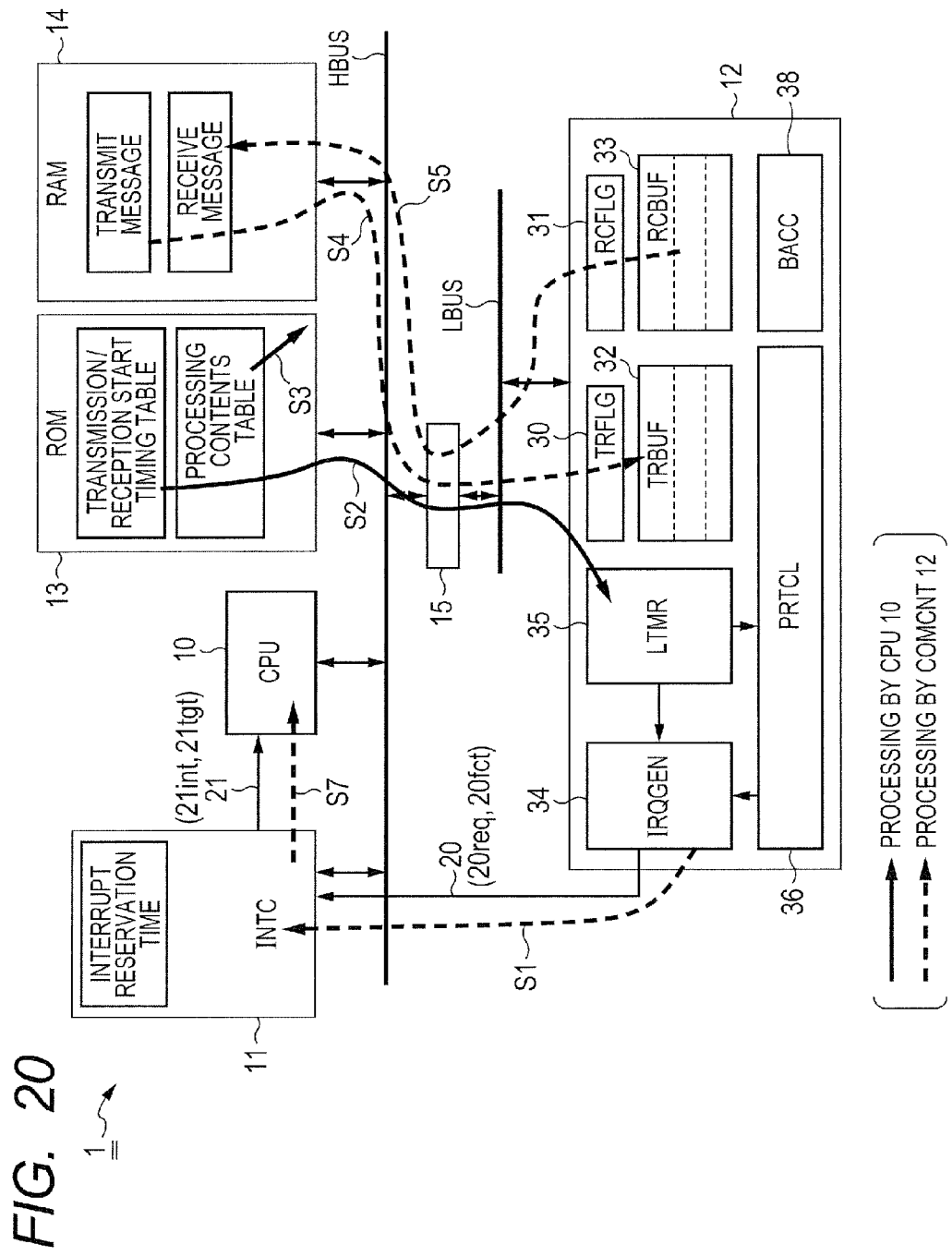
FIG. 20 is a block diagram showing an example microcomputer configuration in which transmit/receive data is transferred between the RAM and the communication control circuit using a buss access function of the communication control circuit.

FIG. 20 shows an example microcomputer configuration in which transmit/receive data is transferred between the RAM and the communication control circuit using a buss access function of the communication control circuit. In this configuration, the communication control circuit 12 is provided with a bus access circuit (BACC) 38 used to access the RAM 14 via the buses LBUS and HBUS. The bus access operation of the buss access circuit 38 is started, though not limited to be so, in the manner of responding to a timeout of the local time timer 35. The contents of the access operation are determined by attributes of the timeout, i.e. whether the timeout interrupt is for transmission processing or for reception processing in time-triggered communication and the cause of the timeout interrupt. The access operation is, though not limited to be so, program-controlled by a protocol controller 36. After completing controlling a transmit message or receive message transfer performed, using the bus access circuit 38, in response to a timeout of the local time timer 35, the communication control circuit 12 outputs a timer interrupt request 20 (20*req* and 20*fct*) for time-triggered communication to the interrupt control circuit 11. In this case, shortening the interrupt reservation time by the time used for bus access operation enables the CPU 10 to start interrupt processing for transmission/reception at the same timing as described in the foregoing with reference to FIG. 8. In other respects, the configuration shown in FIG. 20 is similar to the foregoing configuration, so that detailed description will be omitted.

Figure 21:
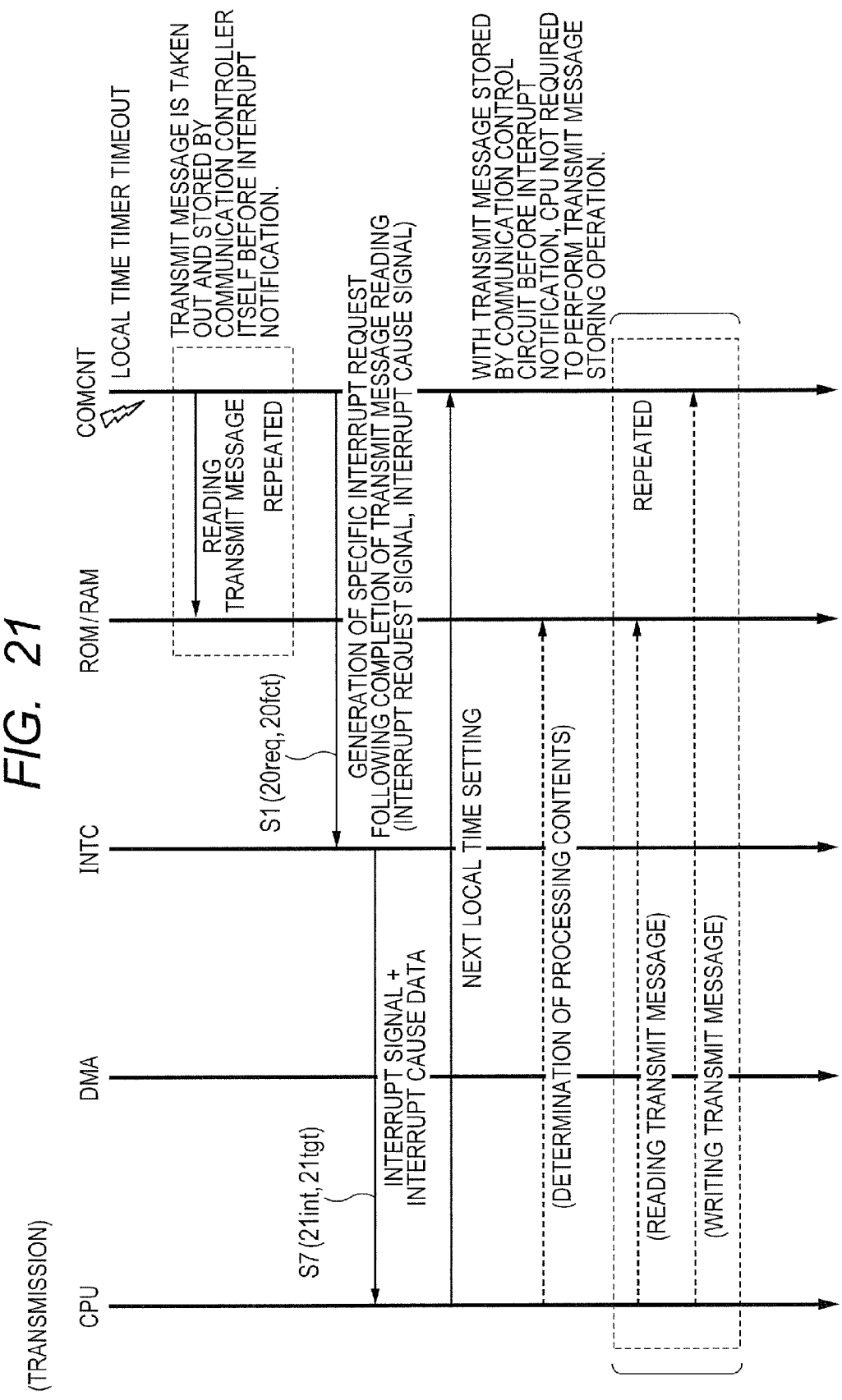
FIG. 21 is a timing chart showing example operation timing for transmission processing performed using the bus access function as shown in FIG. 20.

As shown in FIG. 21, when the local time timer 35 with a local time for next transmission processing set thereon reaches a timeout, the communication control circuit 12 starts bus access operation to be performed using the bus access circuit 38 based on the timeout attributes and writes the transmit message stored in the RAM 14 to the transmission buffer 32. After completing transmit message transfer control, the communication control circuit 12 outputs a timer interrupt request 20 (20*req* and 20*fct*) for time-triggered communication to the interrupt control circuit 11. Subsequently, after elapse of the predetermined interrupt reservation time, an interrupt command 21 (21*int* and 21*tget*) is outputted to the CPU 10 thereby causing the CPU 10 to perform interrupt processing for transmission without transferring the transmit message.

Figure 22:
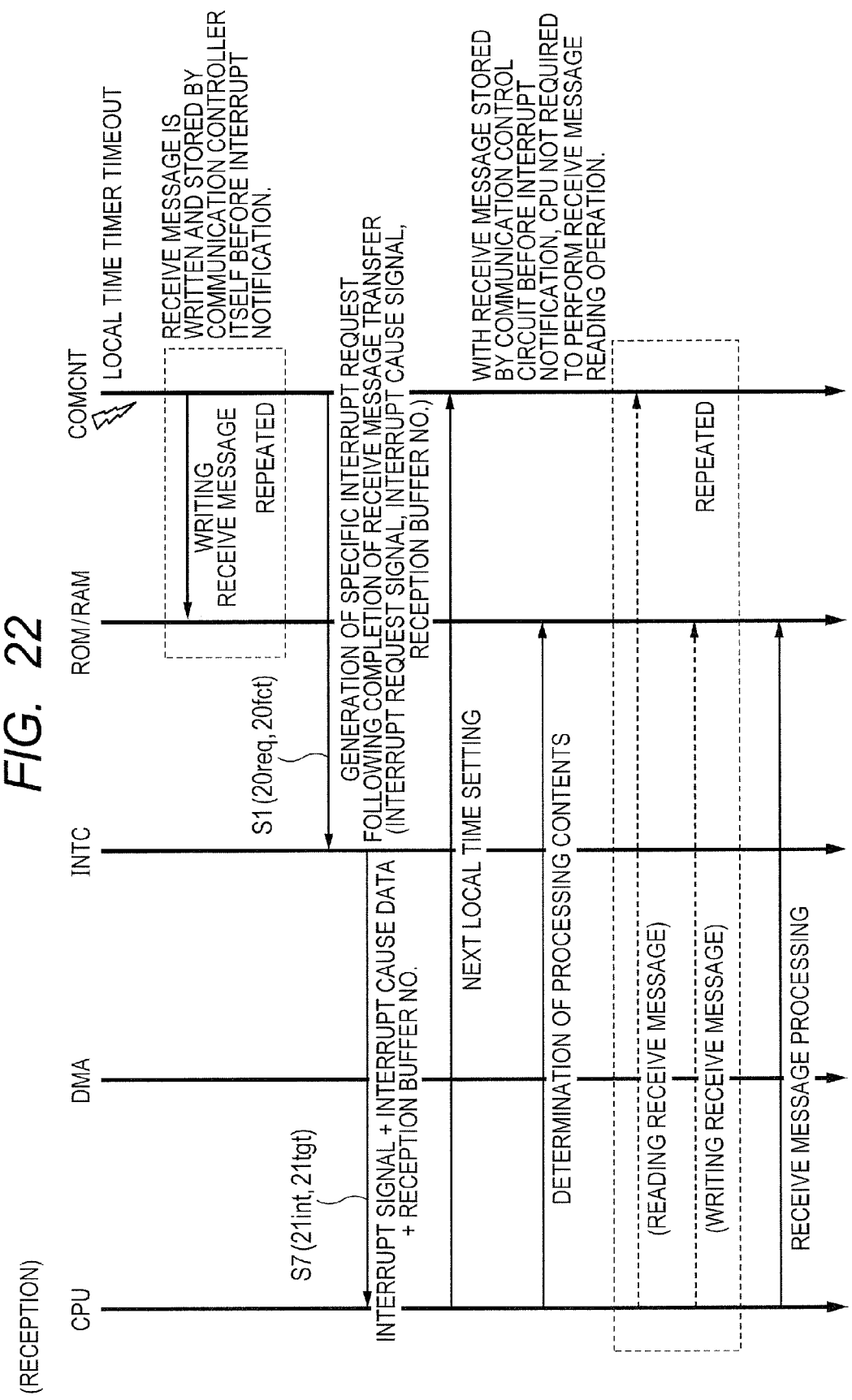
FIG. 22 is a timing chart showing example operation timing for reception processing performed using the bus access function as shown in FIG. 20.

Also, as shown in FIG. 22, when the local time timer 35 with a local time for next reception processing set thereon reaches a timeout, the communication control circuit 12 starts bus access operation to be performed using the bus access circuit 38 based on the timeout attributes and writes the receive message stored in the reception buffer 33 to the RAM 14. After completing receive message transfer control, the communication control circuit 12 outputs a timer interrupt request 20 (20*req* and 20*fct*) for time-triggered communication to the interrupt control circuit 11. Subsequently, after elapse of the predetermined interrupt reservation time, an interrupt command 21 (21*int* and 21*tgt*) is outputted to the CPU 10 thereby causing the CPU 10 to perform interrupt processing for reception using the receive message already transferred to the RAM 14.

In this way, when the local time timer 35 reaches a timeout, the communication control circuit 12, before requesting a timer interrupt, acquires the transmit data by accessing the RAM 14 or transfers the receive data, to the RAM 14 using its bus access function. Therefore, when performing interrupt processing for transmission or reception responding to a subsequent timer interrupt request, the CPU 10 is not required to perform bus access operation for transferring the transmit data from the RAM 14 to the communication control circuit 12 or for transferring the receive data from the communication control circuit 12 to the RAM 14. In this way, the load due to interrupt processing on the CPU 10 can be reduced. This contributes toward reducing the time taken for interrupt processing by the CPU 10 and improving the efficiency of communication processing in time-triggered communication.

<Local Time Timer Channel for Each Cause of Timer Interrupt>

Figure 23:
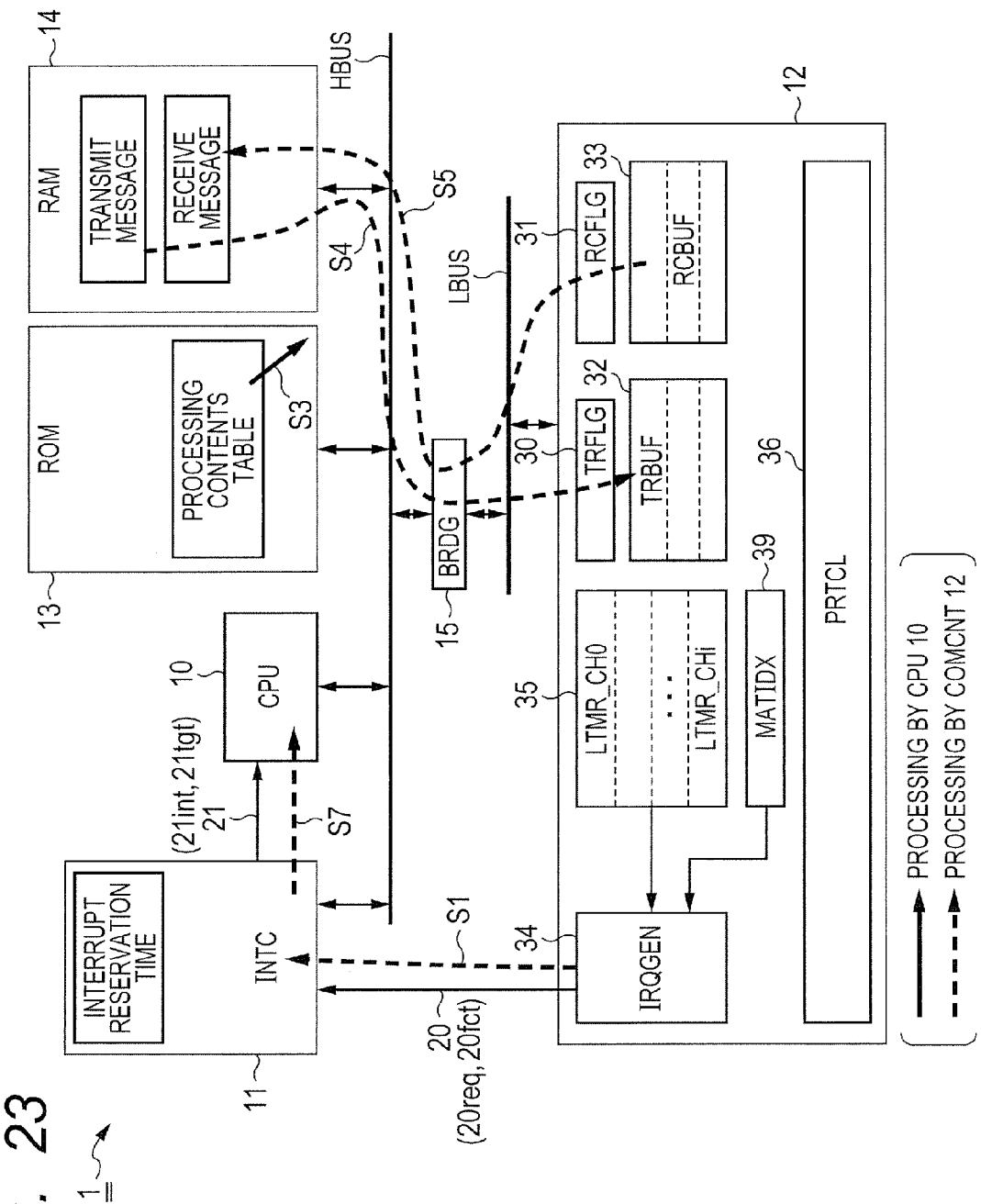
FIG. 23 is a block diagram showing an example microcomputer configuration in which the communication control circuit includes, as a local time timer, a local time timer channel for each cause of specific interrupt.

FIG. 23 shows an example microcomputer configuration in which the communication control circuit includes, as a local time timer, a local time timer channel for each cause of specific interrupt. In this configuration without including the transmission/reception start timing table 50 like the one the ROM 13 is provided with as described in the foregoing with reference to FIG. 11, the local time timer 35 is provided with the function of the transmission/reception start timing table 50. Namely, the local time timer 35 has plural timer channels LTMR_CH0 to LTMR_CHi on each of which timing data for specifying the timing of generating each different timer interrupt request as specified in the transmission/reception start timing table is to be set. Obviously, the timer channels LTMR_CH0 to LTMR_CHi need not each be independent hardware-wise. They may be realized using, for example, software for sequentially forming such timer channels and a sequencer and a timer circuit which are formed as hardware. In this case, the sequencer may be realized as a part of the function of the protocol control circuit 36. The timeout states of the timer channels LTMR_CH0 to LTMR_CHi are reflected on the bit string of a matching index (MATIDX) 39 included in the communication control circuit 12. The bit string indicates causes of the respective interrupts and, for causes of interrupts requiring reception processing to be performed, the bit string indicates the corresponding reception buffer Nos. When any of the timer channels LTMR_CH0 to LTMR_CHi reaches a timeout, the interrupt generation circuit 34 activates an interrupt request signal 20*req* and outputs the contents of the matching index (MATIDX) 39, on which information on the timer channel having reached a timeout is reflected, as an interrupt cause signal 20*fct* to the interrupt control circuit 11. In the case of the embodiment example described with reference to FIGS. 20 to 22, such an interrupt request 20 (20*req* and 20*fct*) is outputted after completion of a required transmit/receive message transfer. In other respects, the configuration shown in FIG. 23 is similar to the foregoing configuration, so that detailed description will be omitted.

Figure 24:
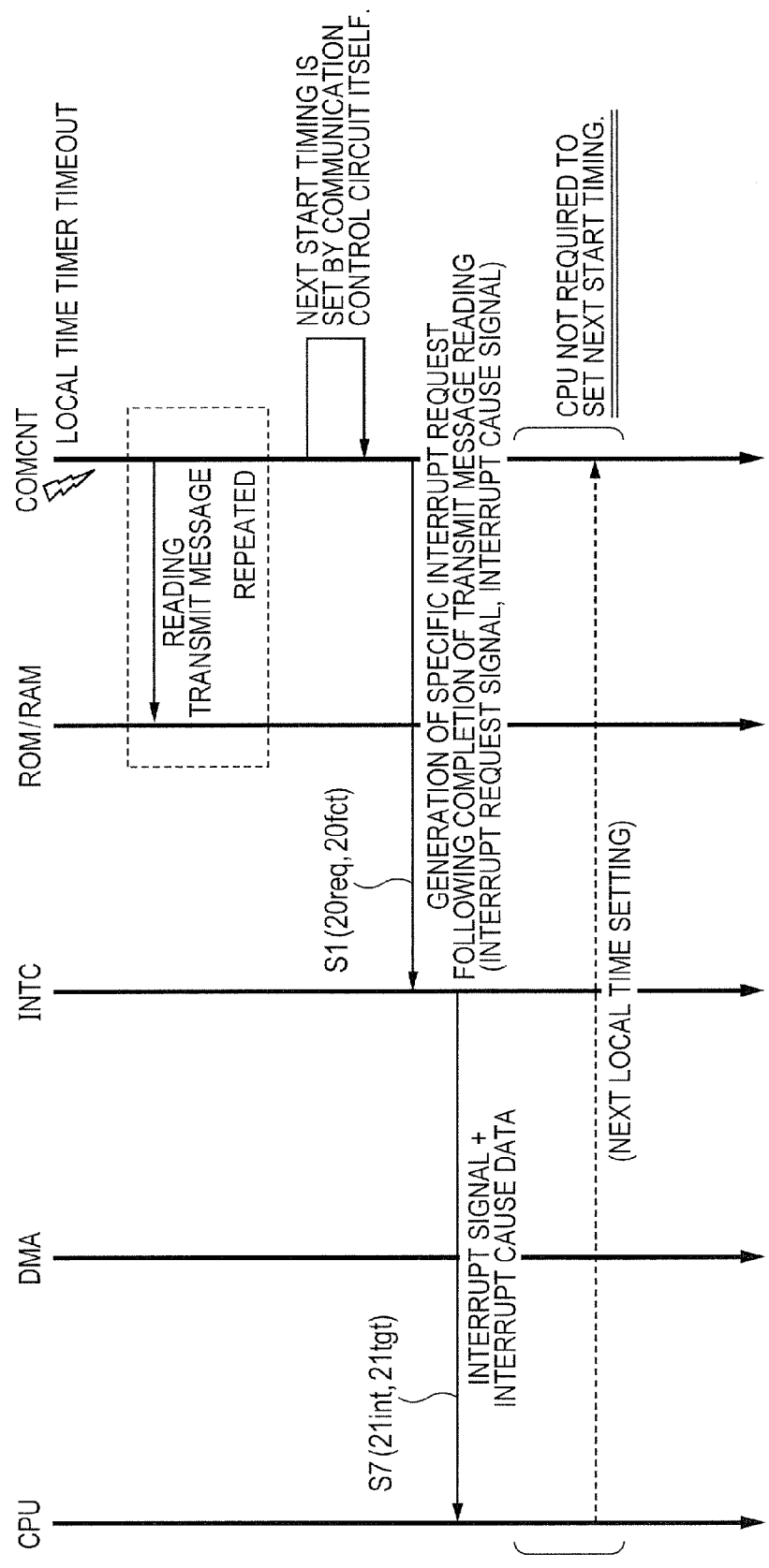
FIG. 24 is a timing chart showing example timing of transmission operation, to take place when the configuration shown in FIG. 23 is employed in place of the configuration shown in FIG. 20.
Figure 25:
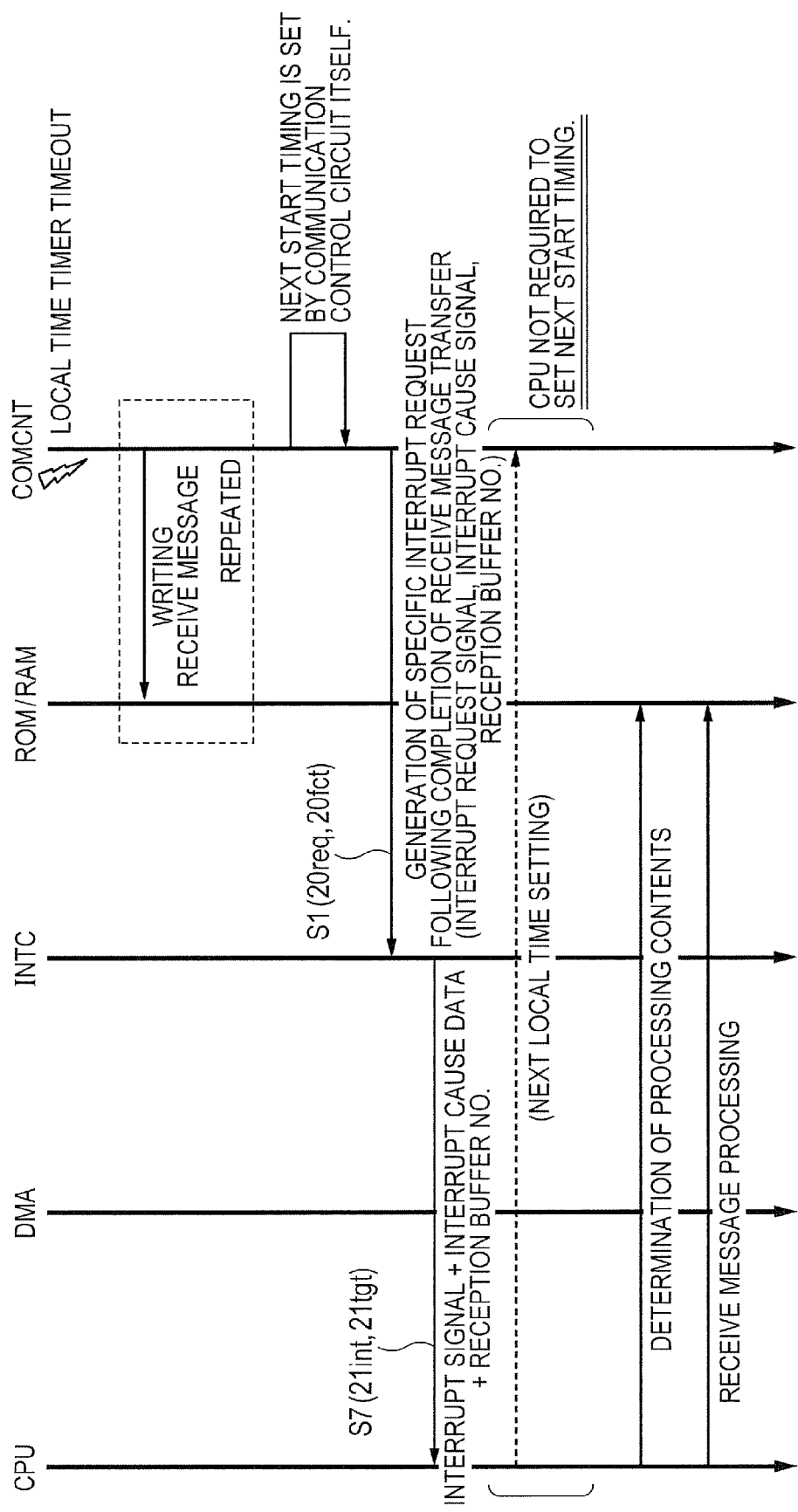
FIG. 25 is a timing chart showing example timing for reception operation to take place when the configuration shown in FIG. 23 is employed in place of the configuration shown in FIG. 20.

FIG. 24 shows the timing of transmission operation to take place when the configuration shown in FIG. 23 is employed in place of the configuration shown in FIG. 20. FIG. 25 shows the timing of reception operation to take place when the configuration shown in FIG. 23 is employed in place of the configuration shown in FIG. 20. As shown in FIGS. 24 and 25, when the local time timer 35 reaches a timeout, next timeout setting operation, for example, setting operation for the timer channel to be operated next can be performed by the communication control circuit 12 itself. Namely, the CPU 10 need not perform the foregoing setting operation (S2) to set the local time timer. After completion of transmit message writing from the RAM 14 to the transmission buffer 32 or after completion of receive data reading and transfer from the reception buffer 33 to the RAM 14, the communication control circuit 12 outputs a specific interrupt request 20 (20*req* and 20*fct*) to the interrupt control circuit 11. Subsequently, the communication control circuit 12 clears the matching index (MATIDX) 39 so that, when a next timeout occurs, the corresponding timer channel can be indicated by the bit string of the matching index 39.

In this way, the CPU 10 is not required to set next timing data on the local time timer 35 by performing interrupt processing and accessing the transmission/reception start timing table every time a timer interrupt request for time-triggered communication is received. This can reduce the load on the CPU 10 due to interrupt processing and can contribute toward reducing the time taken for interrupt processing by the CPU 10 and improving the efficiency of communication processing in time-triggered communication.

<Reference to Transmission/Reception Start Timing Table by Communication Control Circuit>

Figure 26:
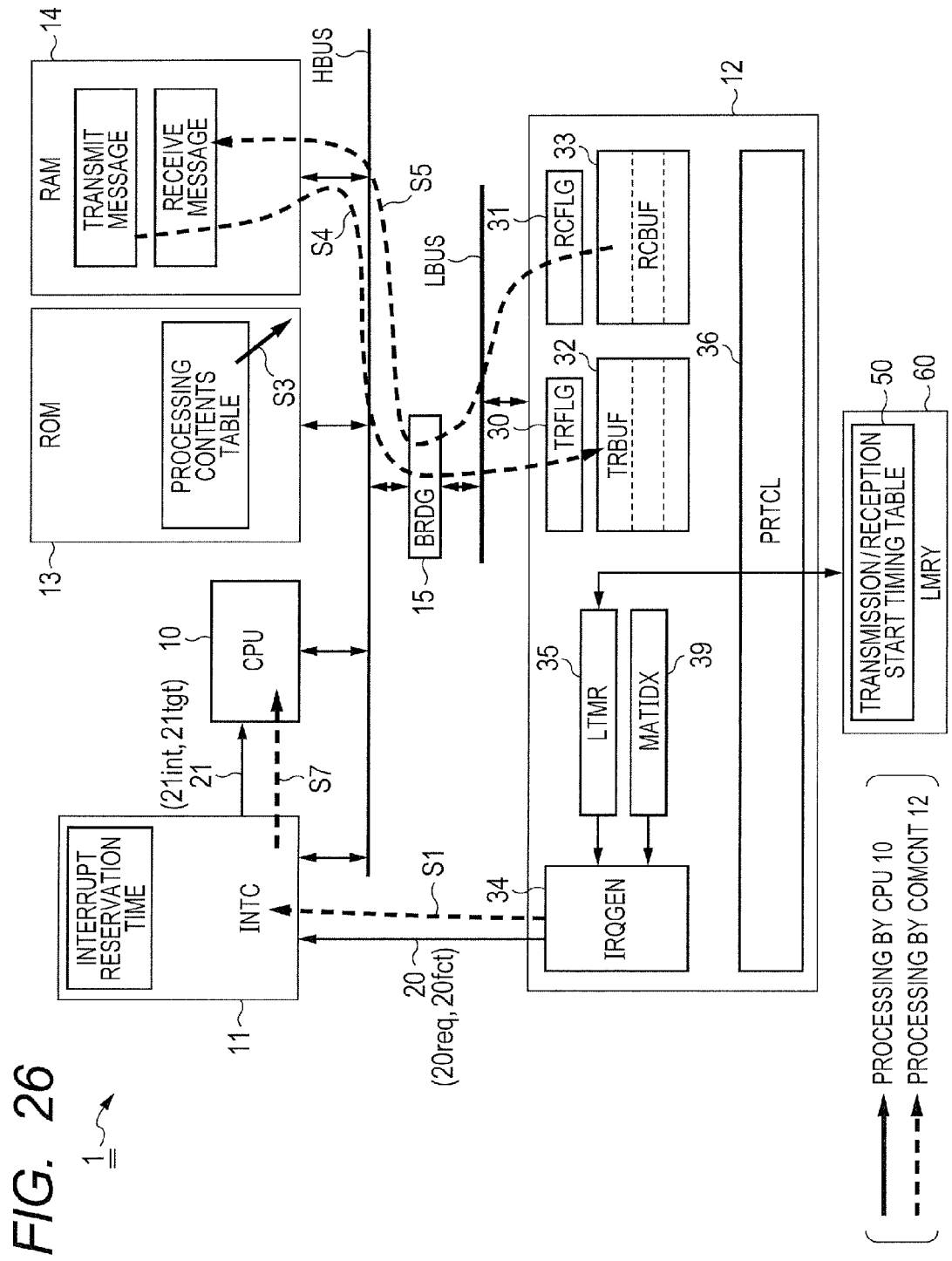
FIG. 26 is a block diagram showing an example microcomputer configuration in which the communication control circuit sets time data on a local time timer by referring to a transmission/reception start timing table.

FIG. 26 shows an example microcomputer configuration in which the communication control circuit sets time data on the local time timer by referring to the transmission/reception start timing table. In this configuration, the transmission/reception start timing table 50 described in the foregoing with reference to FIG. 11 is included not in the ROM 13 but in a local memory (LMRY) 60 of the communication control circuit 12, so that the communication control circuit 12 itself can set next local time on the local time timer 35. The local memory 60 is accessed via the protocol control circuit 36. At this time, a cause of interrupt for specifying the interrupt processing corresponding to the local time set on the local time timer 35 is set in the matching index 39. This setting is performed via the protocol control circuit 36 along with the setting of local time on the local time timer 35. In other respects, the configuration shown in FIG. 26 is similar to the foregoing configuration, so that detailed description will be omitted.

When the configuration shown in FIG. 26 is employed, the communication control circuit 12 itself can set next local time for transmission/reception operation on the local time timer 35 like when the configuration shown in FIG. 24 or FIG. 25 is employed. Therefore, the CPU 10 is not required to set next timing data on the local time timer 35 by performing interrupt processing and accessing the transmission/reception start timing table every time a timer interrupt request for time-triggered communication is received. This can, reduce the load on the CPU 10 due to interrupt processing and can contribute toward reducing the time taken for interrupt processing by the CPU 10 and improving the efficiency of communication processing in time-triggered communication.

The invention made by the present inventors has been concretely described based on an embodiment, but the invention is not limited to the embodiment and it can be modified in various ways without departing from the scope of the invention.

Even though, in describing the above embodiment of the present invention, different features of a microcomputer have been described, based on FIGS. 11, 14, 20, 23 and 26, as if they are realized using different microcomputers, such different features of a microcomputer can be appropriately combined as described under "1. Outline of an Embodiment." Also, time-triggered communication is not limited to AUTOSAR or FlexRay. It is widely applicable to systems each including plural electronic control units coupled to a network in which the electronic control units perform transmission/reception operation in synchronization with a common time used in the network. Namely, time-triggered communication is widely applicable not only to vehicle-mounted systems but also to, for example, production systems. The semiconductor data processing device is not limited to a single-chip microcomputer. It may have a multiple-chip configuration combining, for example, a microprocessor, an accelerator and also a memory chip. The memory to store the transmission/reception start timing table is not limited to a ROM such as an electrically rewritable flash memory. It may be a RAM. The bus configuration and internal circuit modules used in the microcomputer are not limited to those used in the above embodiment. They may be appropriately altered. And the other inventions are following:

(i) A time-triggered communication system, comprising the electronic control units which, by being coupled to a bus, configure a network and which perform transmission/reception operation in synchronization with a common time used in the network, each of the electronic control units having a transmission unit to perform frame transmission, a reception unit to perform frame reception, a local time timer to perform timer operation based on a local time specific to each electronic control unit, a time synchronization control unit which adjusts the local time timer based on a difference between a time when a frame is expected to be received and a time when the frame is received, a storage unit storing a communication schedule specifying a frame transmission/reception procedure to be performed in a periodic communication cycle and setting information related with the communication schedule, and a control unit which, by causing the local time timer and the time synchronization control unit to operate based on the communication schedule and the setting information, controls communication operation of the electronic control unit performed using the transmission unit and the reception unit, wherein the control unit has a central processing unit which controls communication operation by executing a command and an interrupt control circuit which performs interrupt control to cause the central processing unit to perform processing responding to an interrupt request;

wherein the local time timer generates a timer interrupt request for time-triggered communication based on time counting performed based on the setting information related with the communication schedule, and wherein the interrupt control circuit performs control such that, when a timer interrupt request for time-triggered communication is received, the central processing unit to respond to the timer interrupt request delays, by a predetermined reservation time, starting interrupt processing, (ii) A communication system comprising the electronic control units which are coupled to a network and which perform communication via the network at a predetermined time, wherein at least one of the electronic control units includes a semiconductor device having a central processing unit, an interrupt control circuit, a communication control circuit and a timer circuit, wherein the timer circuit detects arrival of the predetermined time to perform communication and gives a notification to the interrupt control circuit;

wherein responding to the notification received from the timer circuit, the interrupt control circuit gives an interrupt notification to the central processing unit;

wherein, at the predetermined time, the communication control circuit performs communication via the network, and wherein, when the interrupt control circuit receives, after receiving a notification from the timer circuit and before the predetermined time is reached, another notification, the central processing unit is inhibited from performing processing responding to a different interrupt notification resulting from the another notification received by the interrupt control circuit, (iii) The communication system, wherein, when, after receiving a notification from the timer circuit and before the predetermined time is reached, a different interrupt notification is received from another circuit, the interrupt control circuit inhibits the different interrupt notification from being transmitted to the central processing unit, (iv) The communication system, wherein the interrupt control circuit has a time counting circuit and, when the predetermined time has been counted by the time counting circuit after a notification is received from the timer circuit, gives an interrupt notification to the central processing unit, (v) The communication system, wherein the interrupt control circuit has a register in which an amount of time to be counted after a notification is received from the timer circuit until the predetermined time is reached can be set, (vi) The communication system, wherein the timing of notification from the timer circuit is set by the communication control circuit, (vii) The communication system, wherein the communication system and the electronic control units are automobile-mounted.

What is claimed is:

1. A semiconductor data processing device comprising:
a central processing unit for executing commands;
a communication control circuit for performing communication control for time-triggered communication; and
an interrupt control circuit for performing interrupt control to cause the central processing unit to perform processing in response to an interrupt request,
wherein the communication control circuit has a local time timer configured for time-triggered communication and which generates a timer interrupt request for time-triggered communication based on time counting by the local time timer,
wherein the interrupt control circuit performs control such that, when a timer interrupt request for time-triggered communication is received, the central processing unit in response to the timer interrupt, request delays, by a predetermined reservation time, starting interrupt processing,
wherein the data processing device further comprises a memory for storing a timing table which holds timing data to be set on the local time timer to specify timing of generating a timer interrupt request for time-triggered communication, and
wherein the communication control circuit refers to timing data held in the timing table every time the count of the local time timer is updated and, when the timing data referred to coincides with the updated count, generates a timer interrupt request.

2. The semiconductor data processing device according to claim 1, wherein the reservation time is longer than a maximum time taken by the central processing unit to perform interrupt processing.

3. The semiconductor data processing device according to claim 1, wherein timing data set on the local time timer for specifying timing of generating a timer interrupt request for time-triggered communication specifies a time which precedes, by the reservation time, true timing of generating the timer interrupt request.

4. The semiconductor data processing device according to claim 1,
wherein the central processing unit, in interrupt processing performed in response to an interrupt signal corresponding to a timer interrupt request for time-triggered communication, reads next timing data to be set on the local time timer from the memory and sets the next timing data on the local time timer.

5. The semiconductor data processing device according to claim 1, wherein the communication control circuit has, as the local time timer, a plurality of timer channels on which timing data specifying timings of generating different timer interrupt requests for different types of interrupt processing are individually set.

6. The semiconductor data processing device according to claim 1,
wherein the communication control circuit outputs, as a timer interrupt request, a timer interrupt request signal and a cause signal indicating a cause of the interrupt, and
wherein, in response to the timer interrupt request signal and the cause signal, the interrupt control circuit outputs an interrupt signal and interrupt cause data required for branching to interrupt processing to the central processing unit.

7. The semiconductor data processing device according to claim 1, having a RAM to be accessed by the central processing unit and a direct memory access controller in which the central processing unit sets transfer control information for controlling a data transfer from the RAM to the communication control circuit,
wherein, in interrupt processing for transmission performed in response to a timer interrupt request for time-triggered communication, the central processing unit causes the direct memory access controller to start data transfer operation and transfer transmit data from the RAM to the communication control circuit.

8. The semiconductor data processing device according to claim 1, having a RAM to be accessed by the central processing unit,
wherein, after elapse of a time specified by timing data set on the local time timer, the communication control circuit performs a bus access operation to transfer transmit data from the RAM to a transmission buffer and, responding to completion of the bus access operation, generates a timer interrupt request for time-triggered communication.

9. The semiconductor data processing device according to claim 1, having a RAM to be accessed by the central processing unit and a direct memory access controller in which the central processing unit sets transfer control information for controlling a data transfer from the communication control circuit to the RAM,
  wherein, in interrupt processing for reception performed in response to a timer interrupt request for time-triggered communication, the central processing unit causes the direct memory access controller to start data transfer operation and transfer receive data from the communication control circuit to the RAM.

10. The semiconductor data processing device according to claim 1, having a RAM to be accessed by the central processing unit, wherein, after elapse of a time specified by timing data set on the local time timer, the communication control circuit performs a bus access operation to transfer receive data from a reception buffer to the RAM and, responding to completion of the bus access operation, generates a timer interrupt request for time-triggered communication.

11. The semiconductor data processing device according to claim 2, wherein, when a timer interrupt request for time-triggered communication is followed, within the reservation time, by another interrupt request, the interrupt control circuit causes the central processing unit to start interrupt processing after elapse of the reservation time giving priority to whichever of the another interrupt request and the timer interrupt request is higher in interrupt priority level.

12. The semiconductor data processing device according to claim 11, wherein the interrupt control circuit has an operation mode for inhibiting multiple interrupt processing in which the central processing unit engaged in interrupt processing responding to a first interrupt request starts interrupt processing responding to a second interrupt request received after the first interrupt request.

13. A semiconductor data processing device comprising;
  a central processing unit for executing commands;
  a communication control circuit for performing communication control for time-triggered communication; and
  an interrupt control circuit for performing interrupt control to cause the central processing unit to perform processing in response to an interrupt request,
  wherein the communication control circuit has a local time timer configured for time-triggered communication and which generates a timer interrupt request for time-triggered communication based on time counting by the local time timer,
  wherein the interrupt control circuit performs control such that, when a timer interrupt request for time-triggered communication is received, the central processing unit in response to the timer interrupt request delays, by a predetermined reservation time, starting interrupt processing,
  wherein the communication control circuit has, as the local time timer, a plurality of timer channels on which timing data specifying timings of generating different timer interrupt requests for different types of interrupt processing are individually set and which outputs, as a timer interrupt request, a timer interrupt request signal and a cause signal indicating a cause of the interrupt,
  wherein, in response to the timer interrupt request signal and the cause of the interrupt signal, the interrupt control circuit outputs an interrupt signal and interrupt cause data required for branching to interrupt processing to the central processing unit,
  wherein the data processing device further comprises a memory for storing a timing table which holds timing data to be set on the local time timer to specify timing of generating a timer interrupt request for time-triggered communication, and
  wherein the communication control circuit refers to timing data held in the timing table every time the count of the local time timer is updated and, when the timing data referred to coincides with the updated count, generates a timer interrupt request.

14. The semiconductor data processing device according to claim 13, further comprising a RAM to be accessed by the central processing unit,
  wherein, after elapse of a time specified by timing data set on the local time timer, the communication control circuit performs bus access operation to transfer transmit data from the RAM to a transmission buffer and, responding to completion of the bus access operation, generates a timer interrupt request for time-triggered communication.

15. The semiconductor data processing device according to claim 13, further comprising RAM to be accessed by the central processing unit,
  wherein, after elapse of a time specified by timing data set on the local time timer, the communication control circuit performs bus access operation to transfer receive data from a reception buffer to the RAM and, responding to completion of the bus access operation, generates a timer interrupt request for time-triggered communication.

16. The semiconductor data processing device according to claim 13, wherein the reservation time is longer than a maximum time taken by the central processing unit to perform interrupt processing.

17. The semiconductor data processing device according to claim 16, wherein, when a timer interrupt request for time-triggered communication is followed, within the reservation time, by another interrupt request, the interrupt control circuit causes the central processing unit to start interrupt processing after elapse of the reservation time giving priority to whichever of the another interrupt request and the timer interrupt request is higher in interrupt priority level.

\* \* \* \* \*